July 9, 1963  W. A. HUNTER ET AL  3,096,547
AUTOMATIC CORE-MAKING MACHINE
Filed Sept. 14, 1961  15 Sheets-Sheet 3

INVENTOR.
WILLIAM A. HUNTER
BY  ROBERT LUND
Atty.

INVENTOR.
WILLIAM A. HUNTER
ROBERT LUND
Atty.

INVENTOR.
WILLIAM A. HUNTER
ROBERT LUND
BY
Atty.

July 9, 1963  W. A. HUNTER ET AL  3,096,547
AUTOMATIC CORE-MAKING MACHINE
Filed Sept. 14, 1961  15 Sheets-Sheet 7

INVENTOR.
WILLIAM A. HUNTER
ROBERT LUND
BY
Atty.

INVENTOR.
WILLIAM A. HUNTER
ROBERT LUND
BY
Atty.

INVENTOR.
WILLIAM A. HUNTER
ROBERT LUND
BY
Atty.

INVENTOR.
WILLIAM A. HUNTER
BY ROBERT LUND
Atty.

July 9, 1963

W. A. HUNTER ET AL 3,096,547

AUTOMATIC CORE-MAKING MACHINE

Filed Sept. 14, 1961

INVENTOR.
WILLIAM A. HUNTER
ROBERT LUND
BY
Atty.

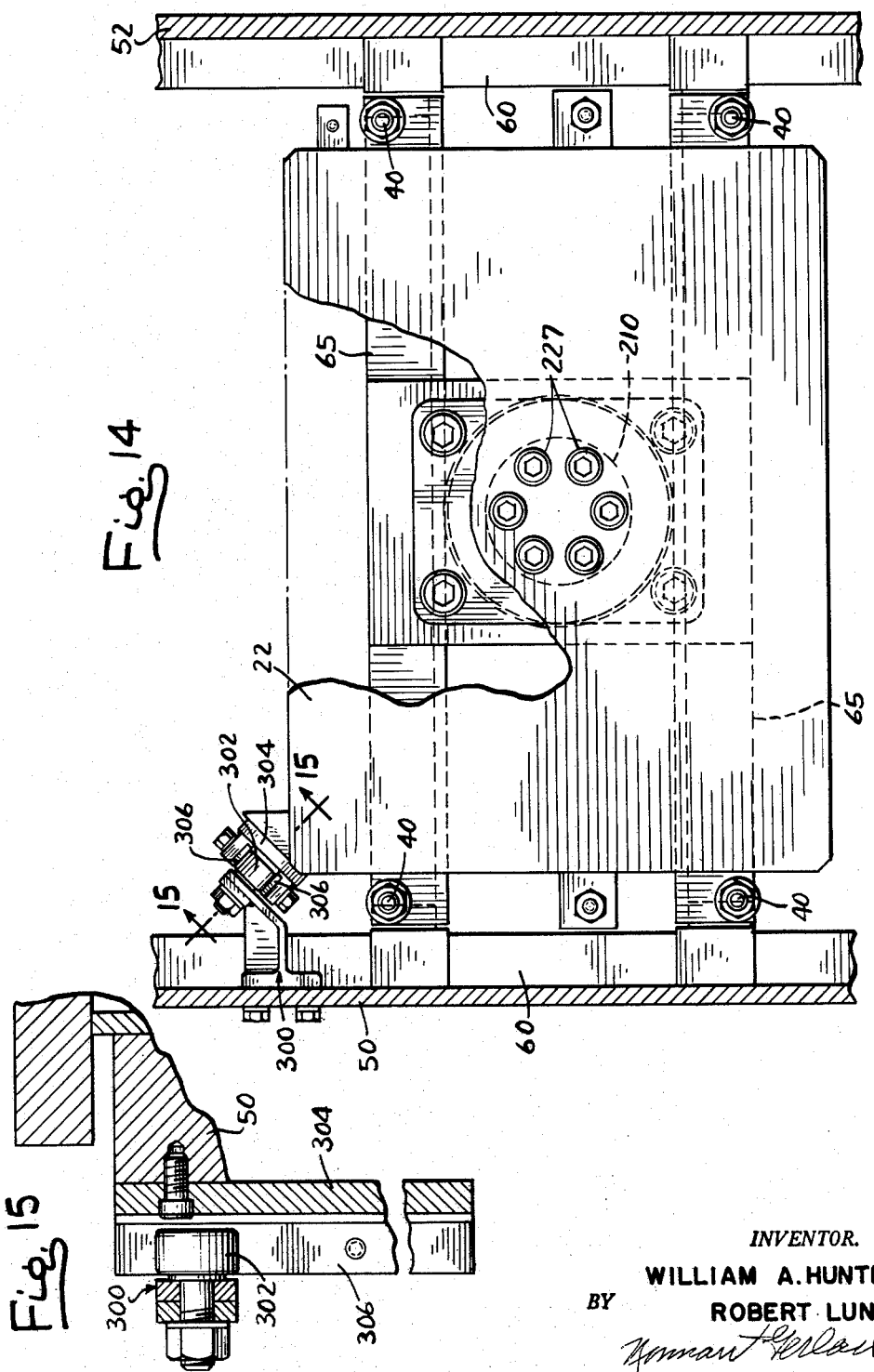

July 9, 1963 W. A. HUNTER ET AL 3,096,547
AUTOMATIC CORE-MAKING MACHINE
Filed Sept. 14, 1961 15 Sheets-Sheet 15

INVENTOR.
WILLIAM A. HUNTER
BY ROBERT LUND
ATTY.

United States Patent Office 3,096,547
Patented July 9, 1963

3,096,547
AUTOMATIC CORE-MAKING MACHINE
William A. Hunter, Morton Grove, and Robert Lund, Melrose Park, Ill., assignors to Pettibone Mulliken Corporation, Chicago, Ill., a corporation of Delaware
Filed Sept. 14, 1961, Ser. No. 138,195
14 Claims. (Cl. 22—10)

The present invention relates to automatic machines for making sand cores, and has particular reference to that type of core-making machine in which the sand that forms the cores is blown into the core box by air under pressure. A machine of this type or character is usually provided with an air chamber and a movable sand magazine which carries a charge of sand of sufficient magnitude to make the cores, from a supply hopper to a position of alignment with and between the air chamber and the core box. The core box is ordinarily supported on a lift table or platform which is raised by a fluid-actuated lift, either pneumatic or hydraulic, and the core box is carried into tight sealing engagement with the lower end of the sand magazine while the latter is forced into tight sealing engagement with the air discharge port of the air chamber. Upon operation of a blow valve, the sand is blown by air from the magazine into the cavity or cavities in the core box and packed therein by the air and sand under high operating pressure. The lift is then lowered to release the core box and the latter with the cores therein is removed from the working area of the lift. Thereafter, the upper and lower core box sections are separated, the cured cores are then stripped from the separated sections, and the core box finally reassembled and returned to the working area for refilling with sand during the next succeeding cycle of machine operation.

The present invention is designed as an improvement over an automatic core-making machine of the character heretofore mentioned in that, with a machine embodying the principles thereof, all machine operations pertaining to the actual formation of the cores, including the blow operation wherein the core box is filled with sand, the polymerization or curing of the resin-bonded sand within the core box cavities, the separation of the core box sections, the stripping of the cores from the core box sections, and the positioning of the stripped cores in an exposed and accessible position for convenient core take-off operations, are performed at or within a single working area or station, with all of the principal operating moving machine parts, such as, the core box and the various stripping instrumentalities associated therewith but not the movable magazine being disposed in superposed relationship and moving vertically. By such an arrangement, a very material saving in the cost of producing the cores is effected for reasons that will be outlined in detail presently.

By reason of the fact that all machine operations exclusive of the sand transfer operations take place in a vertical line, i.e., along a vertical axis through the working area of the machine, no outlying operating stations are required and thus an appreciable saving in the amount of floor space which is involved in the production of a given quantity of cores is effected. Since no lateral or longitudinal machine motions other than the motion or movement of the sand magazine are involved, simplification of machine design and a reduction in the number of involved moving parts are attained. With fewer moving machine parts, the machine is less likely to get out of order and thus maintenance costs are reduced to a minimum.

One of the principal advantages accruing from the vertical in-line operation of the present core-making machine resides in the number of cores that can be made in any given core box over any given period of time. In any core-making machine, the high cost of the core boxes is an item that must be given material consideration. Thus, with lateral core box transfer operations and other core box handling operations at a remote station or stations eliminated, the saving in time involved will allow a shorter machine cycle so that a given core box will produce a larger number of cores than has heretofore been possible.

Another feature of the present invention resides in the fact that advantage is taken of a fast setting resin-bonded sand for core production purposes. With conventional machines and processes, care must be taken to employ a sand having a thermal response which is commensurate with the duration of the activity required in effecting stripping of the core box of the finished cores contained therein, and extending from the initial blow operation to the time that stripper pins which effect the stripping of the core from the first relieved or separated core box section into the core box blow holes for subsequent core push-out purposes. The sand which is employed must not have a faster curing period than the time which elapses before the push-out or stripper pins are in place in the core box since, otherwise, binding of the cores and possible breakage thereof may result due to the lack of a so-called square push-out. Since, according to the present invention and due to the vertical in-line operation of substantially all of the principal parts of the machine as briefly outlined above, the push-out or stripper pins are set into the core box blow holes almost immediately after the blow operation has taken place, a resin-bonded sand having a polymerization period which is measured in seconds rather than in minutes, as is usually the case, may be employed, and a very short dwell period is involved during the curing phase of the machine cycle.

It has been found that with a machine constructed according to the principles of the present invention, due to the elimination of a large number of core box handling operations because of vertical in-line machine operation with no lateral core box transfer operations being involved, and with only a single core box in use, a single operator can attend to the needs or requirements of two operating machines where both machines are serviced by automatic core-unloading apparatuses. Such foundry operation is to be distinguished from the operation of prior fully automatic core-making machines, the most efficient of which requires the services of two operators for each machine in operation on the foundry floor.

The provision of a fully automatic core-making machine possessing the advantages briefly outlined above being among the general objects of the present invention, it is a specific and important object to provide such a machine wherein all of the machine operations directly relating to core formation take place in a small limited working area of the machine where they are conveniently visible to the operator and by vertical in-line machine movements, and wherein the only lateral machine operations involve the lateral displacement of certain machine instrumentalities to an out-of-the-way position outside of the working area when they are not in actual service.

A similar and related object of the invention is to provide a fully automatic and cyclically operable core-making machine wherein the sectional core box, which includes the usual upper cope section and the lower drag section, remains at all times within the working area of the machine and wherein all core box handling or treating operations incident to clamping the core box sections together to produce the complete core box cavities, filling the cavities with sand, applying heat to the core box sections to polymerize the sand in the filled cavities, parting of the core box sections for core release purposes, stripping the cores from the core box sections, rendering the cores readily accessible for core removal purposes, are performed within this working area by instrumentalities which either remain in the working area at all times and in the vicinity of the core box sections being operated upon, or are brought into the working area and remain therein only long enough for them to perform their intended functions, after which they are conducted to respective positions outside of the working area but in close proximity thereto where they are readily available for reentry into the working area with a minimum of motion during the next succeeding machine cycle. Due to the small lateral displacement of machine instrumentalities at their respective elevations into and of the working area of the machine, not only is a saving in floor space effected, but also a saving in overhead foundry space is accomplished. Principally, however, due to the fact that certain of the core box treating instrumentalities are conducted to and from the core box in the working area of the machine, rather than conducting the core box to these instrumentalities for treatment, core box handling operations are reduced to a minimum. Furthermore, the single core box which is employed for all core making operations of a particular class of cores may be regarded as a functional part of the machine itself rather than as an adjunct thereto, and this single core box will serve the function of multiple core boxes which are necessary in connection with the operation of conventional core-making machines which require that the core boxes be transferred between separated stations.

Briefly, in carrying out the two last mentioned objects of the invention, a machine is contemplated wherein the lift table and blow valve are disposed in vertical alignment and afford therebetween a working area within which the core box sections are disposed, the upper core box or cope section being positioned above and movable vertically relatively to the lower core box or drag section. The sand magazine, a set of stripper instrumentalities for the upper core box or cope section, and a set of burner instrumentalities are mounted for movement in unison on a horizontally reciprocable carriage. The carriage is movable between a retracted position wherein the sand magazine is in vertical register with a sand supply hopper, while the cope stripper and burner instrumentalities are in operative position within the working area, and an advanced position wherein the filled sand magazine is in register with the blow orifices of the blow valve and the blow orifices of the magazine are in register with the blow holes in the upper or cope section of the core box. Movements of the carriage and lift table are effected in timed relation to each other and, when the carriage is in its advanced position, the lift table is fully elevated and serves not only to clamp the core box sections together and to clamp the upper or cope section of the core box against the blow orifices of the sand magazine, but also to clamp the magazine against the orifices of the blow valve. The blow operation may then be instituted to fill the core box orifices with sand. With the carriage in its advanced position and during the blow operation, the cope stripper instrumentalities and the burner instrumentalities for the upper or cope section of the box are projected forwardly and assume an out-of-the-way position forwardly of the working area of the machine.

Immediately after the blow operation, the lift table is lowered a small predetermined distance to relieve the pressure between the magazine and blow valve orifices and between the magazine and upper or cope section of the core box, and the carriage then moves to its retracted position to bring the burner and cope stripper instrumentalities carried thereby into operative position in the working area and to move the magazine into register with the supply hopper for reception of sand to be used during the next machine cycle. The core box heating or curing phase of the machine cycle is commenced immediately thereafter. Since the cope stripping instrumentalities are in operative register with the upper or cope section of the core box, the cope stripper pins associated therewith may then by pneumatic means yieldingly be urged downwardly so that they will enter the blow holes in the cope section. Downward movement of these pins is arrested by pairs of cooperating strips which are effective between the stripper pins and the lower or drag section of the core box. The stops remain effective for a brief period of time and until the resin-bonded sand has hardened to produce the cores and thus, since the stripper pins are then squarely in contact with the cores, an even or square push-out of the core from the cope section is attained during the subsequent core-stripping operations.

Immediately after the heating and curing phase of the machine cycle, lowering of the lift table is resumed and after a small downward displacement of the lift table, stops on the upper or cope section of the core box engage fixed stops on the machine framework and continued downward movement of the cope section is arrested while downward movement of the lower or drag section continues. Additionally, during this downward displacement of the lift table, the pressure of the cope stripper pins on the polymerized or hardened cores is not relieved so that these pins serve to force the cores downwardly from the cope section. Downward pressure on the cores is relieved by the dropping of the lower or drag section of the core box as it follows the downward movement of the table.

Further downward movement of the lift table leaves the cope section of the core box elevated on the fixed stops of the machine framework, while the drag section moves downwardly to a region within the working area well below the cope section. Floating drag stripper pins, which, in the elevated positions of the drag section, project into holes in the latter section and have their ends terminating flush with the walls of the core box cavities, are caused to engage arresting posts on the machine framework so that as the drag section of the core box continues to move downwardly with the table, they prevent the cores from being lowered with the drag section. Since the upper ends of the pins are in engagement with the packed sand at the time of the blow operation and remain in contact with the sand during the curing phase of the machine cycle, a square push-out is attained when the drag section is lowered away from the cores as set forth above.

The table continues to be lowered to the fullest extent of which it is capable, and since the drag section of the core box, now freed of the cores, continues to be lowered with the table, the cores remain elevated on the upper ends of the drag stripper pins where they are conveniently accessible for removal from the working area. After removal of the cores, the machine cycle is repeated for the production of the next group of cores.

The specific objects of the invention are manifold and will not be enumerated herein, it being deemed sufficient to state that they reside in the combination of features which have been briefly outlined above and result in the production of a finished core or a group of cores during each machine cycle, all with a minimum of machine movements and at a single working station or area.

In the accompanying fifteen sheets of drawings forming a part of this specification, one illustrative embodiment of an automatic core-making machine in accordance with the principles of the present invention has been shown.

In these drawings:

FIG. 14 is a sectional view taken on the line 14—14 of FIG. 12;

FIG. 15 is an enlarged sectional view taken on the line 15—15 of FIG. 14; and

BRIEF DESCRIPTION OF MACHINE

Figure 1:
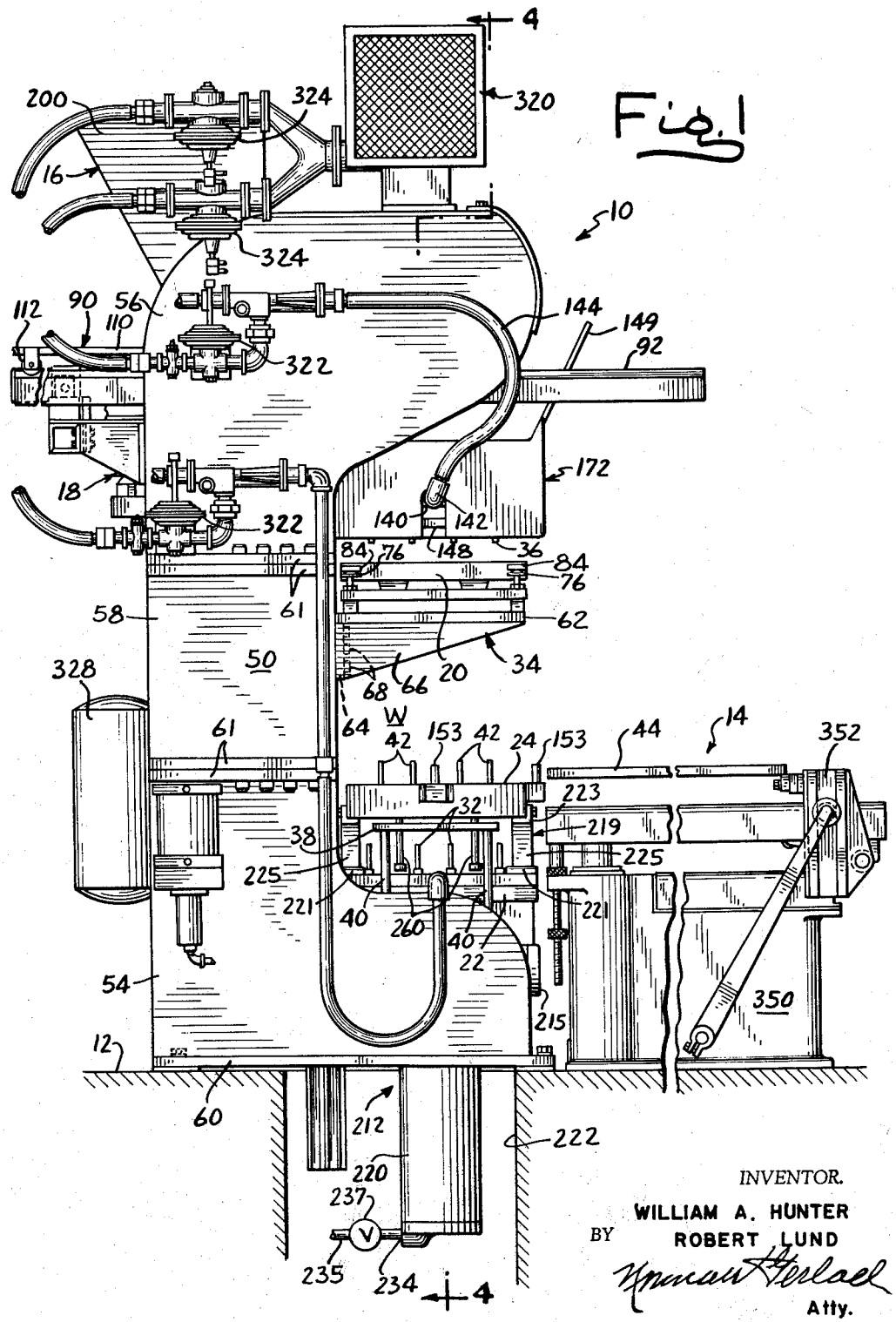
FIG. 1 is a side elevational view of a cyclically operable automatic core-making machine constructed in accordance with the principles of the present invention, the parts of the machine being shown in the positions which they assume at the commencement of a machine cycle.

Referring now to the drawings in detail and in particular to FIGS. 1 to 5, inclusive, one exemplary form of automatic core-making machine constructed in accordance with the principles of the present invention has been designated in its entirety by the reference numeral 10. The machine 10 is shown in the drawings as being positioned upon a foundry floor 12 or other supporting surface. Positioned adjacent to the machine and in operative relationship with respect thereto is a core-unloading apparatus 14. The latter is disclosed in, and forms the subject matter of, copending United States patent application Serial No. 114,483, filed on June 2, 1961, and entitled "Core Unloading Apparatus for an Automatic Core-Making Machine." It forms no part of the present invention and no claim is made herein to any novelty associated with the same. It will be briefly described herein since the over-all efficiency of the present core-making machine from an operational standpoint is materially increased by association of the core-unloading apparatus with the core-making machine. It will be understood, however, that the core-making machine may, if desired, be unloaded manually or by means other than by the use of the apparatus 14. For a full understanding of the nature and operation of the core-unloading apparatus, reference may be had to the aforementioned copending United States patent application.

Briefly, the core-making machine of the present invention involves in its general organization a hopper assembly 16 which funnels sand into a sand magazine 18 when the latter is in a retracted or rearwardly shifted position. After the magazine 18 has been filled with sand, it moves automatically forwards and overlies an upper core box or cope section 20. During the forward movement of the magazine 18, a vertically shiftable table 22 rises and engages a lower core box or drag section 24 and forces the same upwardly against the upper core box section 20, after which the entire or complete core box in the form of the sections 20 and 24 is forced upwardly and bodily as a unit into sealing engagement with the magazine 18 thereabove. At this time, air under pressure is admitted or blown into the magazine 18 under the influence of a blow valve 26 in order to carry the sand therein into the subjacent core box cavities 28 (see FIG. 6) which exist within the core box and are established when the upper and lower (cope and drag) sections of the core box are initially brought together as previously described.

Figure 11:
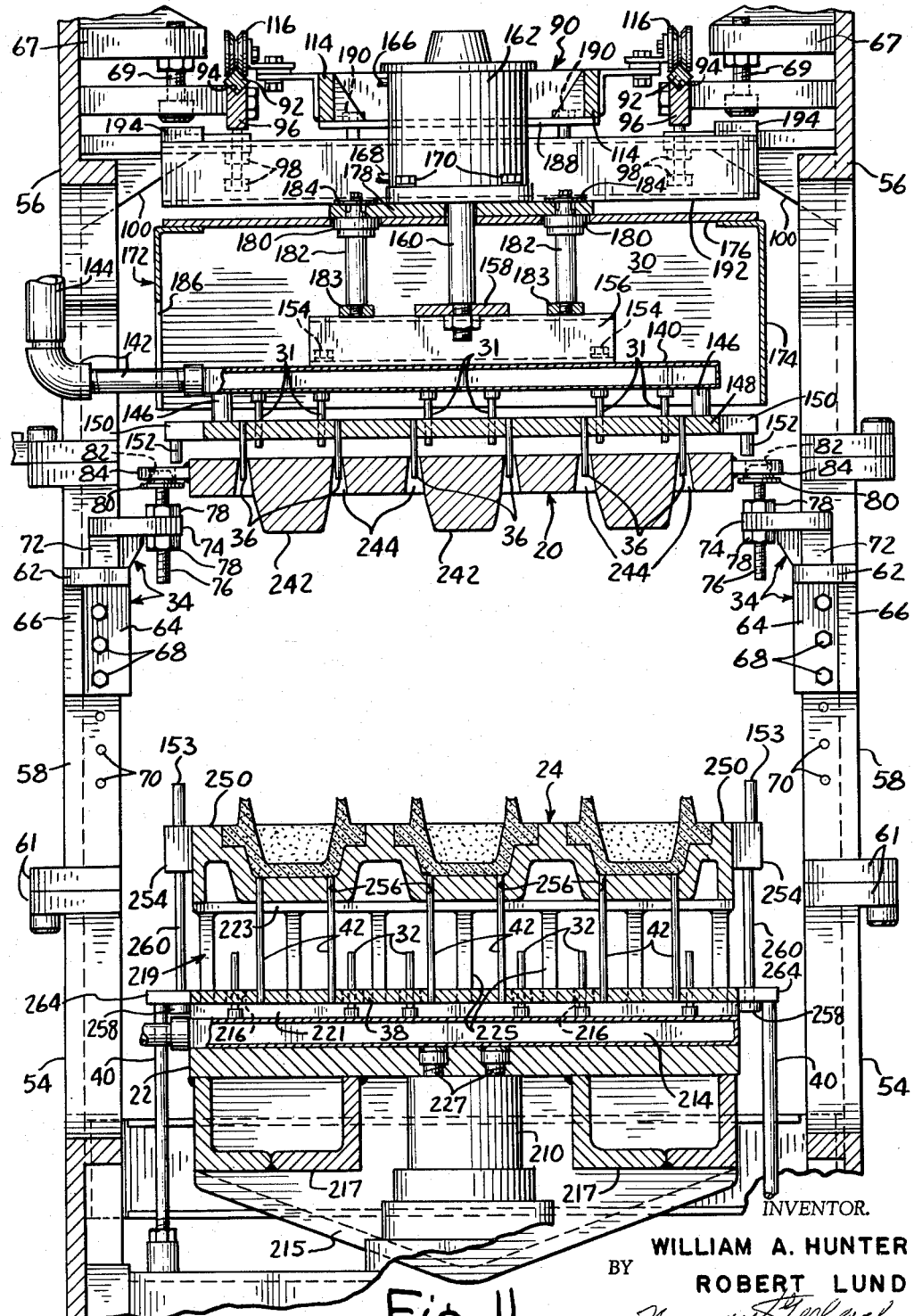
FIG. 11 is an enlarged sectional view taken on the line 11—11 of FIG. 10.

Immediately after such filling of the core box cavities 28, the table 22 is lowered a predetermined distance and brought to rest, whereupon the mating upper and lower core box sections 20 and 24 move downwardly in unison a commensurate distance, thus separating the upper core box section 20 from the magazine 18 and bringing the two mating or abutting core box sections to a curing position. The magazine 18 is then returned to its rearmost position beneath the hopper assembly 16 for refilling with sand during the next succeeding machine cycle. Retraction of the magazine 18 brings an upper gas burner and core stripper assembly 30 into operative register with the upper core box section 20 in order that flames emanating from the burners 31 associated therewith will maintain the necessary curing temperature for the sand contained within the core box, the sand being of the resin-bonded or coated type. Heat is also applied to the lower box section by way of burners 32 (see FIG. 11) which are movable bodily with the table 22.

Immediately after the curing phase as heretofore described, the table 22 is further lowered and the upper core box section 20 is caused to seat upon a pair of cope-arresting brackets 34 so that its downward movement is arrested. As the table 22 continues to move downwardly, the lower core box section 24 is forcibly parted from the upper core box section 20 by means of a series of cope stripper pins 36 which are caused to enter the core box cavities 28 and force the finished core C downwardly, thus stripping the cores from the upper core box section 20 and also releasing the lower core box section 24 from its sealing engagement with the upper core box section 20 and allowing the same, together with the cores C contained therein, to follow the further descending movements of the table 22.

Continued downward movement of the table 22 serves to bring a drag stripper plate 38 into seating engagement with the upper ends of a plurality of fixed arresting posts 40 on the hereinafter described machine framework. The stripepr plate 38 carries a plurality of drag stripper pins 42. When the drag stripper plate 38 is arrested in its downward movement by the fixed arresting posts 40, continued lowering of the lower core box section 24 will permit the upper ends of the drag stripper pins 42 to enter the core box cavities 28 and engage the cores C and thus arrest any further downward movement thereof. As the table 22 approaches the limit of its downward movement, the lower core box section 24 is lowered away from the cores C, thus stripping the cores from the lower core box section and leaving the cores high upon the upper ends of the pins 42 and in an exposed elevated position with respect to the table 22, as shown in dotted lines in FIG. 12 and in full lines in FIG. 13. In this elevated and exposed position, the core-unloading apparatus 14 may be operated in such manner that a series of pick-off fingers 44 associated with the apparatus may be projected beneath the cores C and thereafter elevated to lift the cores from the upper ends of the pins 42 and finally withdrawn to carry the cores C away from the working area of the machine 10.

The operation of the core-making machine is cyclic or repetitious and the unloading apparatus 14 is adapted to be operated in timed relation to the machine cycle of the machine 10 so that, at the end of each machine cycle, the cores C are removed to clear the machine for operation during the next succeeding machine cycle.

THE MACHINE FRAMEWORK

The Main Frame Members

The core-making machine 10 involves in its general organization a pair of composite three-part upright side members 50 and 52, each side member including a lower foot casting 54, an upper head casting 56, and a connecting intermediate casting 58. The composite side members, when assembled, are generally of C-shape configuration, as best shown in FIG. 1. The lower foot castings 54 are provided with flanges 60 along their lower edges in order that the composite side members may be secured by bolts or studs to the foundry floor 12 in spaced parallel relationship. The various castings 54, 56 and 58 are provided with adjacent flanges 61 by means of which they are bolted together in their proper superposed relationship. To attain the desired C-shape configuration, the upper head castings 56 project forwardly of the intermediate castings 58, as also do the lower foot castings 54. The area or region immediately forwardly of the two intermediate castings 58 and between the two side members 50 and 52, has been labelled W in FIGS. 1, 5 and elsewhere, and may be regarded as the working area of the machine. It is in this area that the finished cores are left supported upon the upper ends of the drag stripper pins 42 for pick-off purposes as previously described.

Figure 7:
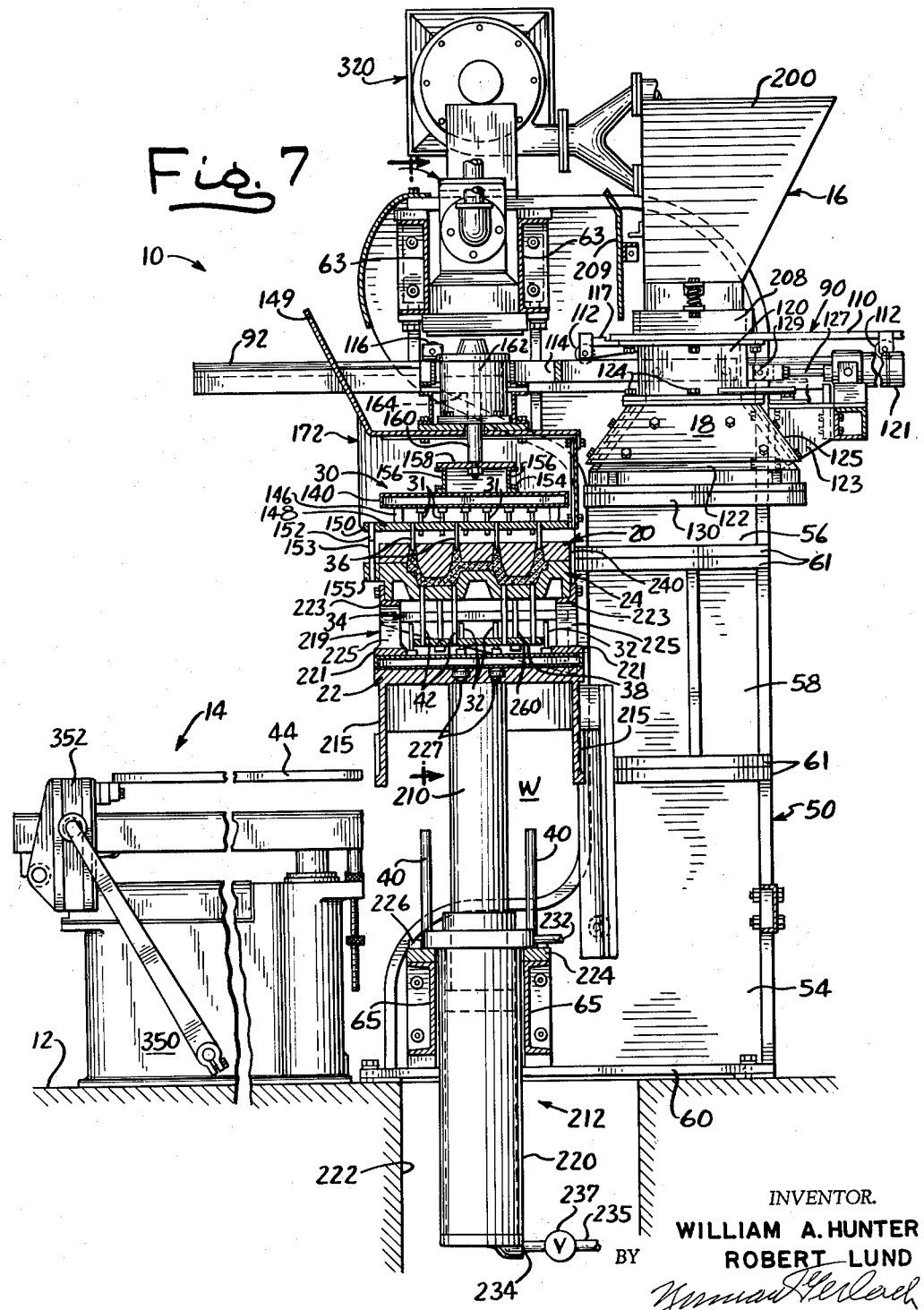
FIG. 7 is a sectional view taken substantially centrally and vertically through the machine and showing the machine at the commencement of the heating or curing phase and with the sand magazine in its full position for reception of sand to be used in the next succeeding machine cycle.
Figure 9:
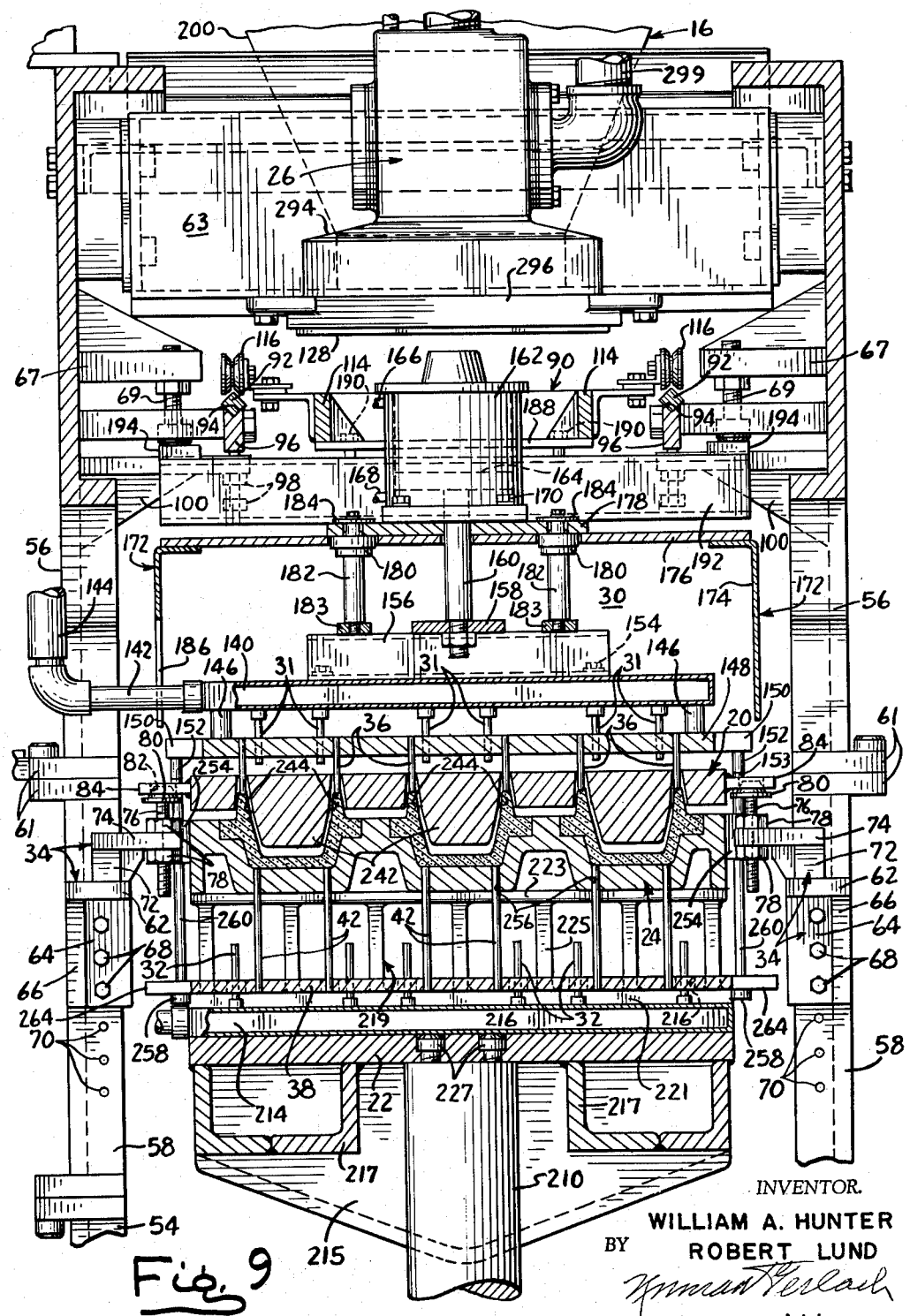
FIG. 9 is a sectional view similar to FIG. 8 but showing the machine in a mid-cycle position immediately after the cope-stripping operation.
Figure 10:
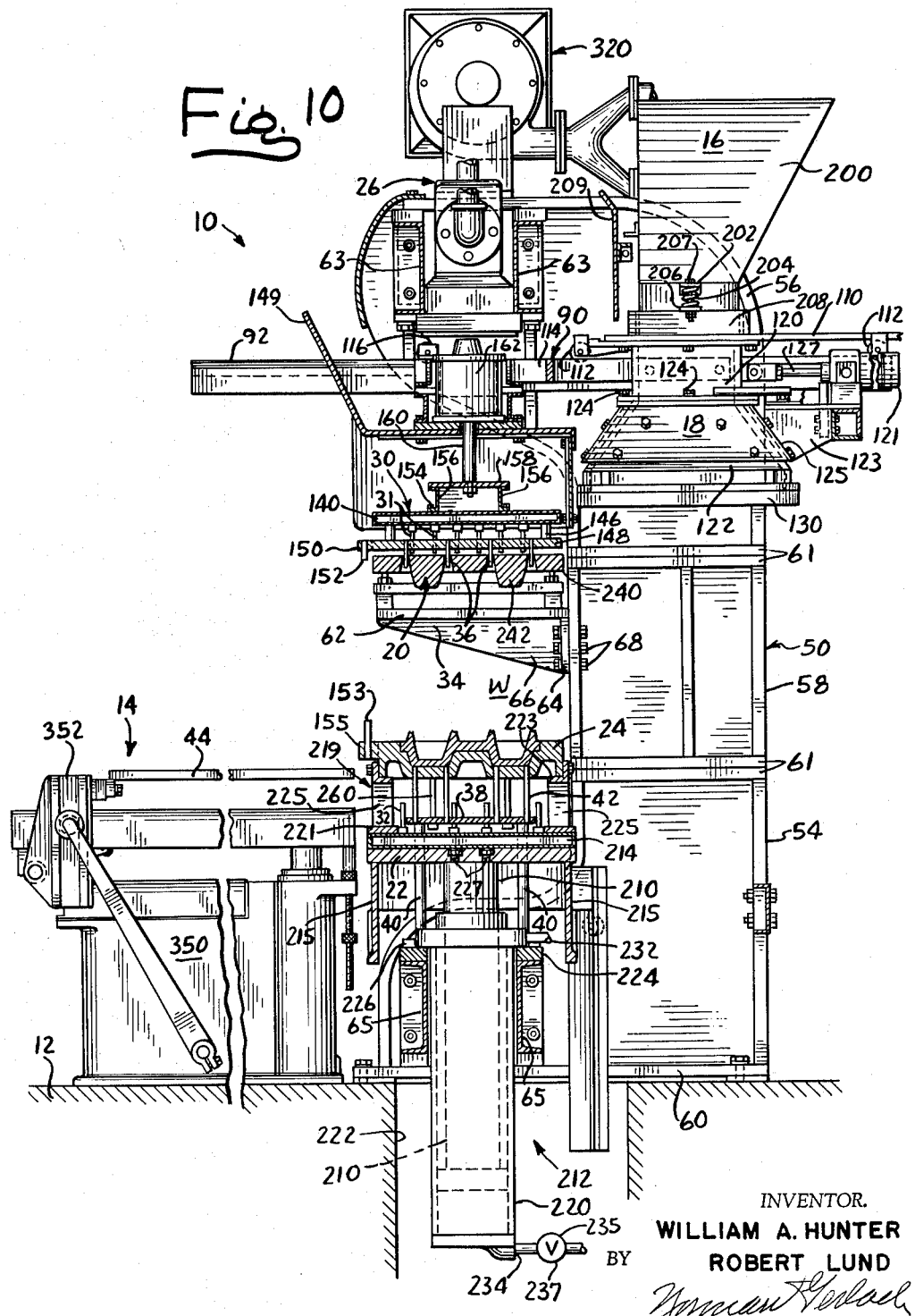
FIG. 10 is a sectional view taken substantially centrally and vertically through the machine in a mid-cycle position immediately prior to the drag-stripping operation.

As best shown in FIGS. 7, 9 and 10, upper transverse spacer members 63 extend between and serve to connect the side members 50 and 52, while similar lower transverse spacer members 65 extend between and serve to connect these side members near the bottom of the machine framework as a whole.

Figure 6:
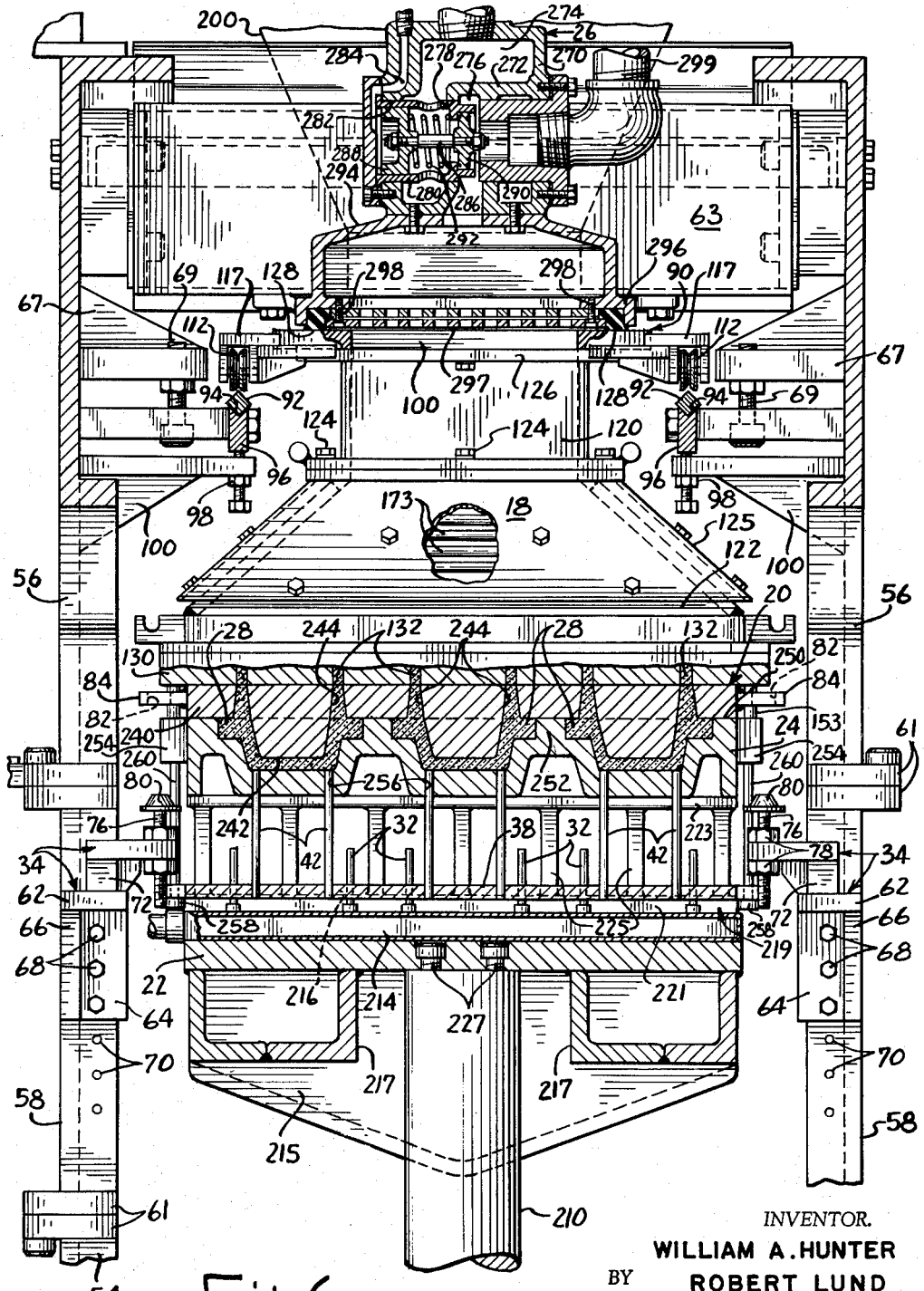
FIG. 6 is an enlarged sectional view taken on the line 6—6 of FIG. 5.

As shown in FIGS. 6, 9 and elsewhere in the drawings, two reaction brackets 67 on the upper head castings 56 of the side members 50 and 52 have associated therewith vertically adjustable reaction pins 69. The latter are adapted to assimilate the upward thrust which is exerted upon certain portions of the upper burner and cope stripper assembly 30 at a predetermined period in the machine cycle, all in a manner and for a purpose that will be made clear presently.

The Cope-Arresting Brackets

The previously-mentioned cope-arresting brackets 34 are carried on the intermediate castings 58 of the side members 50 and 52, as shown in FIG. 6, and means is provided whereby the elevations thereof may be varied within predetermined limits. Accordingly, as shown in FIG. 9 and elsewhere in the drawings, each bracket 34 includes a horizontal leg 62, a vertical web 64, and a reinforcing web or gusset 66. The vertical webs 64 of the brackets 34 constitute flanges by means of which the brackets as a whole may be attached to the adjacent side member 50 or 52. Attachment bolts 68 extend through suitable bolt holes in the webs 64 and are selectively received in a series of vertically spaced holes 70 in the adjacent intermediate castings 58. Supported on spacer blocks 72 above the level of the horizontal legs 62 are holders 74 through which extend loosely a plurality of vertically adjustable arresting pins 76. The arresting pins 76 are threaded and are vertically adjustable in the holders 74 by means of clamping nuts 78. Each arresting pin 76 is provided with an enlarged conical centering head 80 which is designed for registry with the rim portion of a respective hole 82 in a laterally projecting ear 84 on the upper core box section 20 at one side thereof. Each holder 74 preferably carries two such arresting pins 76, there being four such pins in all, and each pin is adapted to support one corner of the upper core box section 20 when the core box is lowered to such an extent that the upper core box section comes to rest upon the pins 76.

The Carriage-Supporting Track

The previously mentioned upper burner and cope stripper assembly 30 and the sand magazine 18 at the upper end of the machine 10 are mounted on a carriage 90 (see FIGS. 4 to 9, inclusive and also FIG. 11) and are thus movable in unison. The carriage 90 is movable horizontally in a fore and aft direction between an advanced position wherein the assembly 30 is projected forwardly of the machine framework and the magazine 18 is in operative register with the blow valve 26 thereabove and the lock-up core box therebelow as previously described, and a retracted position wherein the magazine 18 is in register with the hopper assembly 16 thereabove, while the burner and cope stripper assembly 30 is in operative register with the upper core box section 20.

Figure 2:
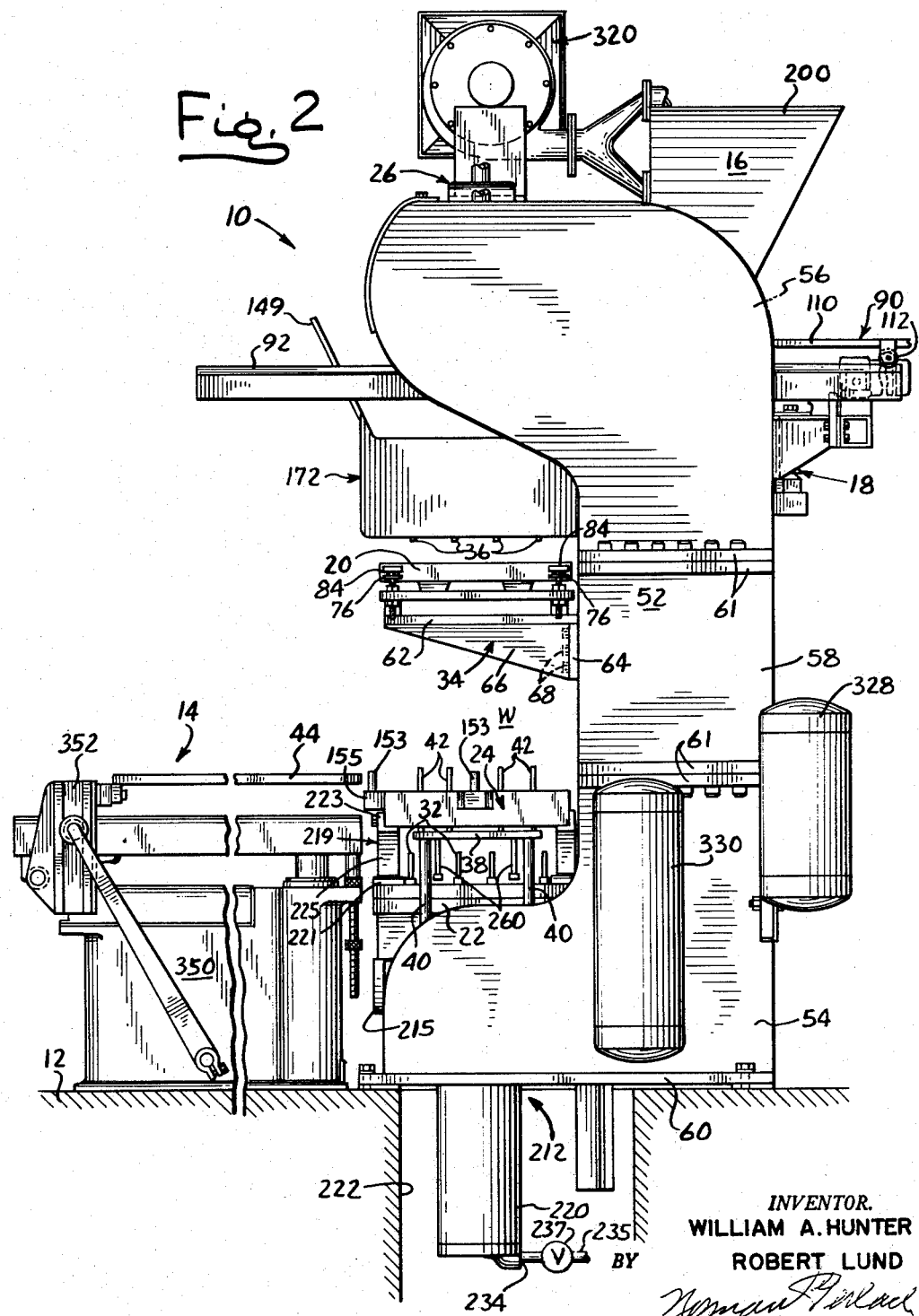
FIG. 2 is a side elevational view, similar to FIG. 1 but showing the opposite side of the machine.
Figure 5:
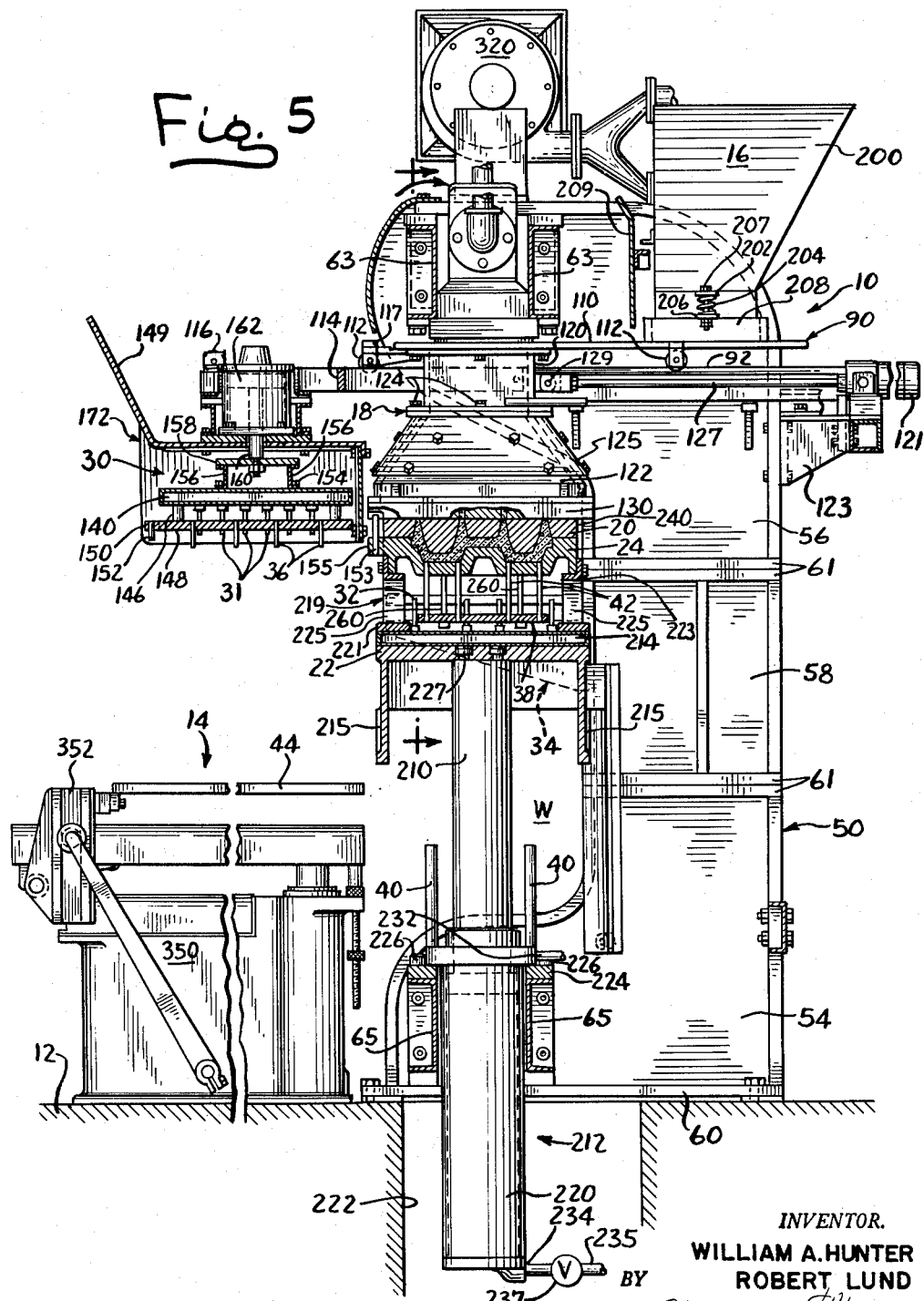
FIG. 5 is a sectional view taken substantially centrally and vertically through the machine and showing the sand magazine filled and the machine in its blow position.

The carriage 90 is mounted for such fore and aft reciprocation on a pair of track-forming rails 92 which may best be seen in FIGS. 6, 8, 9 and 11. The rails 92 are in the form of elongated lengths of rod stock. They are square in transverse cross section and are set on edge in V-troughs 94 in vertically adjustable rail supports 96, the latter being adjustable by reason of adjustment devices 98 which are associated with fixed supporting brackets 100 on the side members 50 and 52. As shown in FIGS. 2, 5 and 7, the rails 92 and the rail supports 96 project forwardly an appreciable distance beyond the side members 50 and 52 of the machine framework.

THE MAGAZINE UPPER BURNER AND COPE STRIPPER ASSEMBLY AND CARRIAGE

The Carriage

The carriage 90 which supports the sand magazine 18 and the upper burner and cope stripper assembly 30 includes an upper rear rectangular carriage platform 110 (see FIGS. 6 and 10) with grooved traction rollers 112 at the four corners thereof, and a lower forward carriage frame 114 of rectangular design having grooved traction rollers 116 mounted on brackets 117. The upper rear carriage platform 110 serves to support the sand magazine 18, while the lower forward carriage frame 114 serves to support the upper burner and cope stripper assembly 30. As previously stated, the carriage 90 is movable between an advanced position wherein the upper burner and cope stripper assembly 30 is disposed an appreciable distance forwardly of the side members 50 and 52, i.e., forwardly and above the level of the working area W as shown in FIG. 5, and a retracted position wherein the assembly 30 is disposed immediately above the working area W and in vertical alignment with the path of movement of the core box. When the carriage is in its advanced position, the magazine 18 is in register with the blow valve 26 and is also in vertical register with the path of movement of the core box.

The movements of the carriage 90 in a fore and aft direction are effected under the control of an air cylinder 121. The latter is mounted on a suitable supporting bracket 123 on the machine framework and has a plunger 127 operatively connected to an ear 129 on the carriage.

The Sand Magazine

The sand magazine 18 consists of two principal parts, namely, an upper magazine section 120 and a lower magazine section 122, the two sections being connected together by bolts 124. The upper magazine section 120 is generally cylindrical, while the lower magazine section 122 is of frusto-conical design. A frusto-conical sheet metal heat shield 125 surrounds the lower section 122 and serves to shield the resin-bonded or coated sand within the magazine from the effects of residual heat in and around the working area of the machine and thus prevent any possibility of preliminary polymerization of the sand mass within the magazine before it has been discharged into the core box.

The upper rim of the upper magazine section 120 is provided with a flange 126 (see FIG. 6), such flange being supported on the platform 110 and serving to provide a flat sealing surface for sealing engagement with an elastomeric sealing strip 128 which is associated with the blow valve 26 in a manner and for a purpose that will be set forth hereinafter. The lower rim of the frustoconical lower magazine section 122 serves to support a blow plate 130 having a series of blow holes 132 therein. The character of the sand employed and the over-all size of the blow holes 132 are such that, when the magazine 18 is filled with sand, the sand will be self-supporting within the magazine and will not run out through the blow holes under the influence of gravity. Stated otherwise, the west strength of the sand will preclude sand run-out until such time as the blowing operation is initiated by means of the blow valve 26.

*The Upper Burner and Cope Stripper Assembly*

Figure 16:
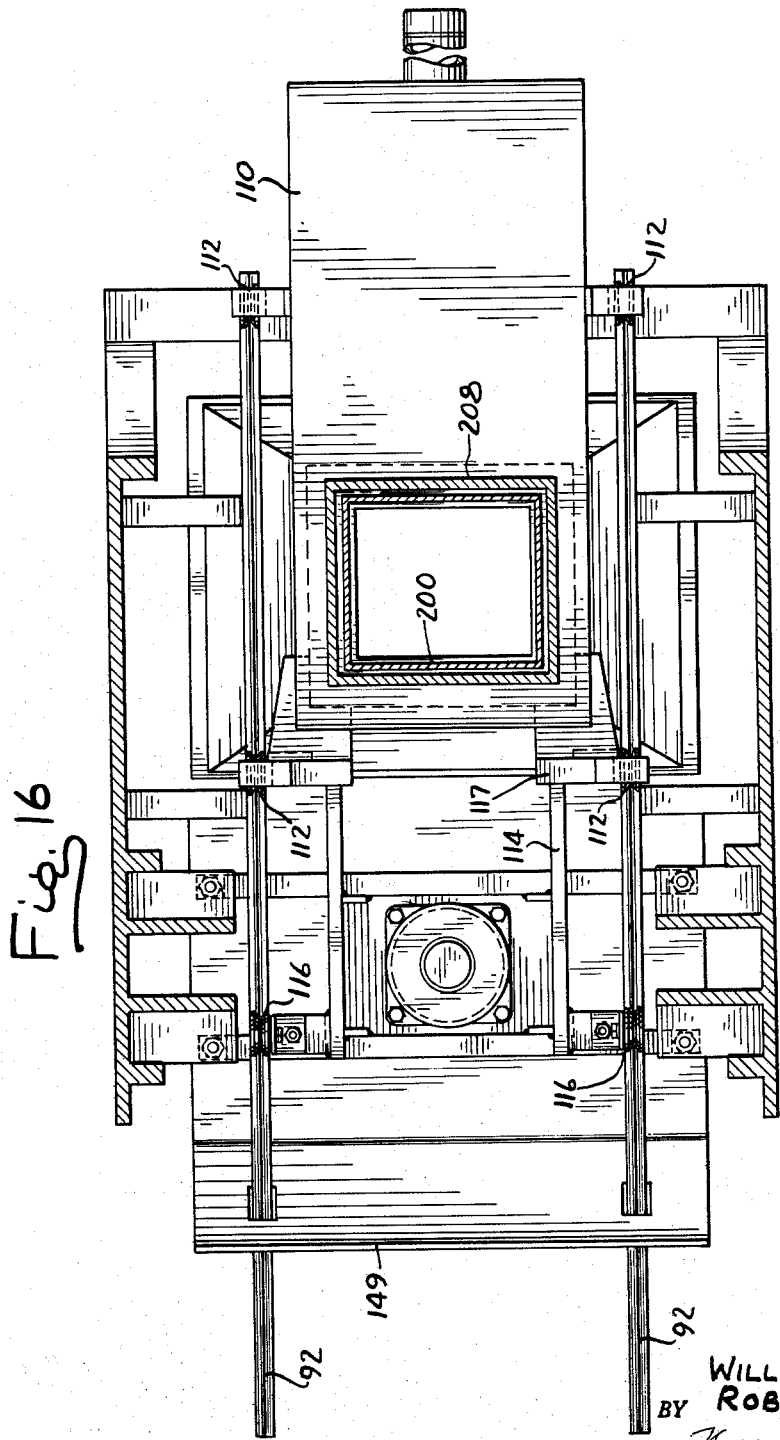
FIG. 16 is an enlarged sectional view taken on the line 16—16 of FIG. 12.

The upper burner and cope stripper assembly 30 (see FIG. 5) includes a set of gas burner instrumentalities and a set of cope stripper instrumentalities. The gas burner instrumentalities include the previously-mentioned burners 31 (see also FIGS. 3, 4, 7, 8, 9, 10 and 13) which are supported on, and in communication with, an upper gas manifold 140. The gas manifold 140 is connected through various conventional pipe sections 142 to a flexible gas supply conduit 144 leading from a source of gaseous fuel. It serves to support by means of blocks 146 a cope stripper plate 148 which in turn serves to support in a depending manner the cope stripper pins 36. The gas burners 31 project from the manifold 140 below the level of the cope stripper plate 148 as clearly shown in FIGS. 4 and 9. A heat shield 149 is provided at the forward end of the assembly 30 and is provided with holes 151 therein through which the track rails 92 extend, as best seen in FIG. 16.

The cope stripper instrumentalities include the previously-mentioned cope stripper plate 148 and the depending cope stripper pins 36. The cope stripper plate 148 is provided with a series of ears 150 in the marginal regions thereof and each ear carries a depending stop pin 152. The stop pins 152 are designed for cooperation, during the curing phase of the machine cycle, with a series of counterpart stop pins 153 on the lower core box or drag section 24, all in a manner that will become clear presently.

The cope stripper plate 148, being suspended by means of the blocks 146 from the manifold 140, is movable bodily in unison vertically with the manifold. The manifold 140 is connected by bolts 154 (see FIGS. 9 and 11) to a pair of oppositely facing horizontal channel pieces 156 (see also FIGS. 7 and 10) and the latter are secured to a flat horizontal plate 158 which is carried at the lower end of a plunger 160. Such plunger is associated with an air cylinder 162 which is mounted on the lower forward carriage frame 114 of the carriage 90. The plunger 160 carries at its upper end a piston 164 which is reciprocable in the air cylinder 162. The cylinder is provided with ports 166 and 168 which are adapted to be connected through flexible lines or conduits (not shown) to a suitable control valve from which air under pressure may be selectively applied to the opposite ends of the cylinder.

Figure 8:
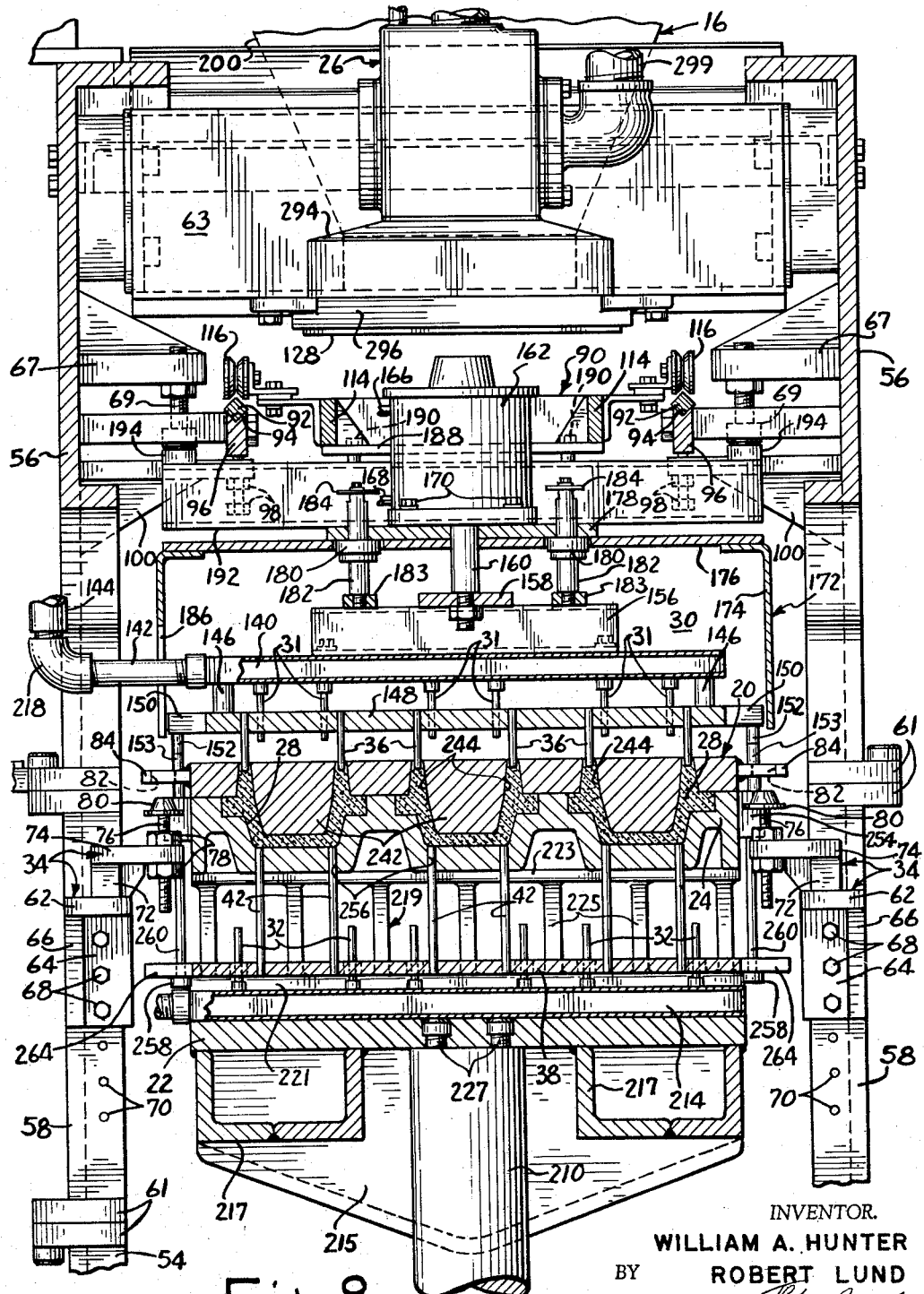
FIG. 8 is a sectional view taken on the line 8—8 of FIG. 7.

Suspended from the lower end of the cylinder 162 by means of bolts 170 is a heat shield 172 (see FIGS. 8 and 9). Such heat shield includes an apron portion 174 and a top plate 176. A series of cooling pipes 173 is interposed between the heat shield 172 and the lower magazine section 122 and is adapted to have a liquid cooling media, such, for example, as water, circulated therethrough. A guide plate 178 is mounted centrally on the top plate 176 and has associated therewith a pair of guide sleeves 180. Guide posts 182 project slidably through the guide sleeves 180 and have their lower ends seated on respective crossbars 183 which extend across and bridge the distance between the channel pieces 156. The upper ends of the guide posts 182 carry stop washers 184. Normally, the piston 164 is maintained in a retracted upper position within the cylinder 162 so that the burner instrumentalities and the cope stripper instrumentalities assume elevated positions wherein they are housed within the heat shield 172 as shown in FIG. 5. With these instrumentalities thus retracted, the stop washers remain out of contact with the guide plate 178. When the plunger 160 is extended from the cylinder 162 during cope-stripping operations, as will be described subsequently, the burner instrumentalities and the cope-stripping instrumentalities are projected downwardly from within the confines of the heat shield as shown in FIG. 9, and the stop washers 184 will engage the guide plates 178 to limit the downward movement of these instrumentalities with respect to the heat shield 172. In order to afford freedom of movement of the burner instrumentalities and the cope stripper instrumentalities, a clearance slot 186 is provided in the lower edge of the heat shield 172 in order to allow vertical movement of the pipe sections 142.

Suspended from a crossbar 188 by means of suspension bolts 190 is a beam member 192 which carries a pair of stop blocks 194 at the ends thereof. These stop blocks 194 are designed for engagement with the vertically adjustable reaction pins 69 on the brackets 67 to assimilate the upward thrust of the cylinder 162 and all of the instrumentalities supported thereby, including the manifold 140 when air is supplied to the cylinder 162 to force the plunger 160 downwardly and extend the core stripper pins 36 into the core box cavities 28 during the curing and core-ejecting phases of the machine cycle.

THE HOPPER ASSEMBLY

Figure 12:
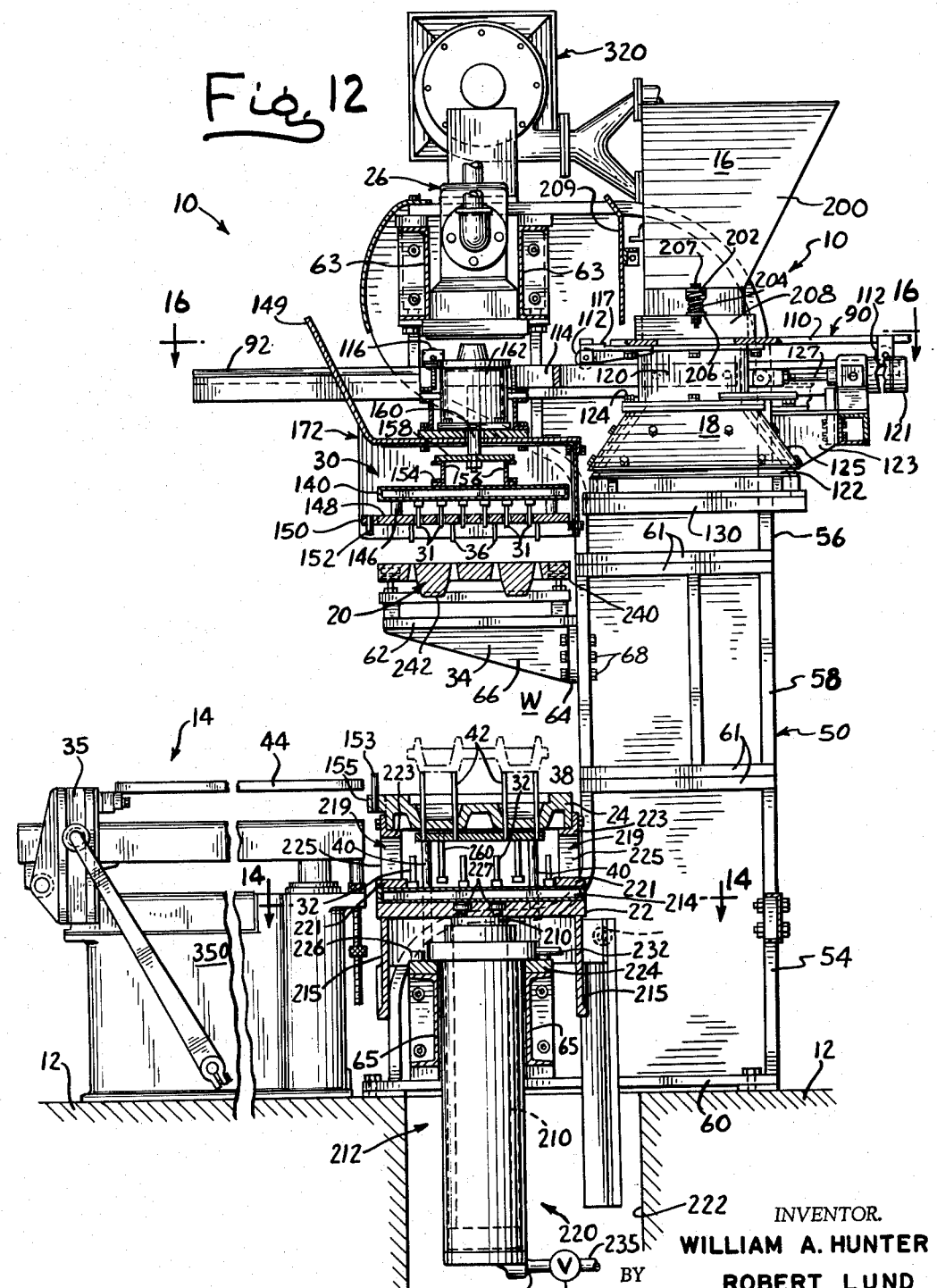
FIG. 12 is a sectional view taken on the line 12—12 of FIG. 3.

Referring now to FIGS. 12 and 16 of the drawings, the hopper assembly 16 comprises a funnel-shaped supply hopper 200 which is rectangular in horizontal cross section and is suitably supported in fixed relationship upon the machine framework in the upper region of the side members 50 and 52 at the upper rear portions thereof. Thrust brackets 202 are welded or otherwise secured to the lower regions of the hopper 200 and serve as reaction members for the upper ends of a series of compression springs 204. The lower ends of the springs 204 bear downwardly against similar thrust brackets 206 on a generally rectangular sand-confining frame 208 which surrounds the lower portion of the supply hopper 200 and overlies the horizontally shiftable upper rear carriage platform 110. Centering bolts 207 serve to maintain the springs 204 in position between their respective thrust brackets 202 and 206. The springs 204 thus serve normally to urge the sand-confining frame 208 bodily downwardly into firm frictional contact with the horizontally shiftable carriage platform 110 therebeneath so that, during forward shifting movement of the carriage 90 when the magazine 18 is transferring sand from the hopper 16 to the working area of the machine for core box-filling purposes, the frame 208 will operate in the manner of a scraper to restrain any underflow of sand from the magazine onto the surface of the platform 110.

A heat shield 209 is fixedly mounted on the machine framework and is disposed immediately forwardly of the hopper assembly 16 to protect the resin-bonded or coated sand within the supply hopper 200 from the effects of radiated heat originating at the burners 31.

THE VERTICALLY SHIFTABLE TABLE

*The Table Proper*

Referring now to FIGS. 2 to 12, inclusive, and in particular to FIGS. 6 and 7, the table 22, in the illustrated form of the machine 10, is in the form of a flat plate, the medial region of which is secured to the upper end of a plunger 210 in associated relation with a table-actuating ram assembly 212. Supported upon the table 22 and movable bodily therewith is a lower gas manifold 214 which constitutes an element of a lower burner assembly by means of which heat is applied to the lower core box or drag section 24 during the heating core box phase of the machine cycle. An apron 215 depends from the marginal regions of the table 22 and straddles the upper portion of the ram assembly 212 when the table is in its lowermost position. Reinforcing channels 217 extend across the apron sides.

The Lower Burner Assembly

Still referring to FIGS. 6 and 7, the lower burner assembly includes the previously mentioned burners 32. These burners are carried by, and communicate with, the manifold 214 and project upwardly through holes 216 in the drag stripper plate 38 so that the flames issuing from these burners will be directed upwardly against the lower core box or drag section 24 during the heating phase of machine operation. The table 22, the manifold 214, the burners 32, and the drag stripper plate 38 are movable bodily in unison under the control of the vertical movements of the plunger 210. Suitable pipe fittings, one of which is shown at 218 in FIGS. 8 and 9 and elsewhere in the drawings, lead to a flexible conduit (not shown), such conduit being similar to the conduit 144 for the upper gas manifold 140 and serving to supply a gas-air mixture to the manifold 214.

The Drag Support

Seated upon the upper face of the gas manifold 214 on opposite sides thereof are two drag-supporting frames 219 in the form of open cage-like castings having base portions 221 which extend along the side edges of the manifold, upper angle portions 223 which receive therein the opposite side edges of the lower core box or drag section 24 during a portion of the machine cycle, and interconnecting vertical webs 225. The function of the frames 219 is to fill in space when core boxes of varying height are substituted in the machine, or in other words, to vary the effective height of the table 22 to accommodate use of core boxes which vary in thickness for the production of cores of different sizes and shapes.

The Table-Actuating Ram Assembly

Figure 4:
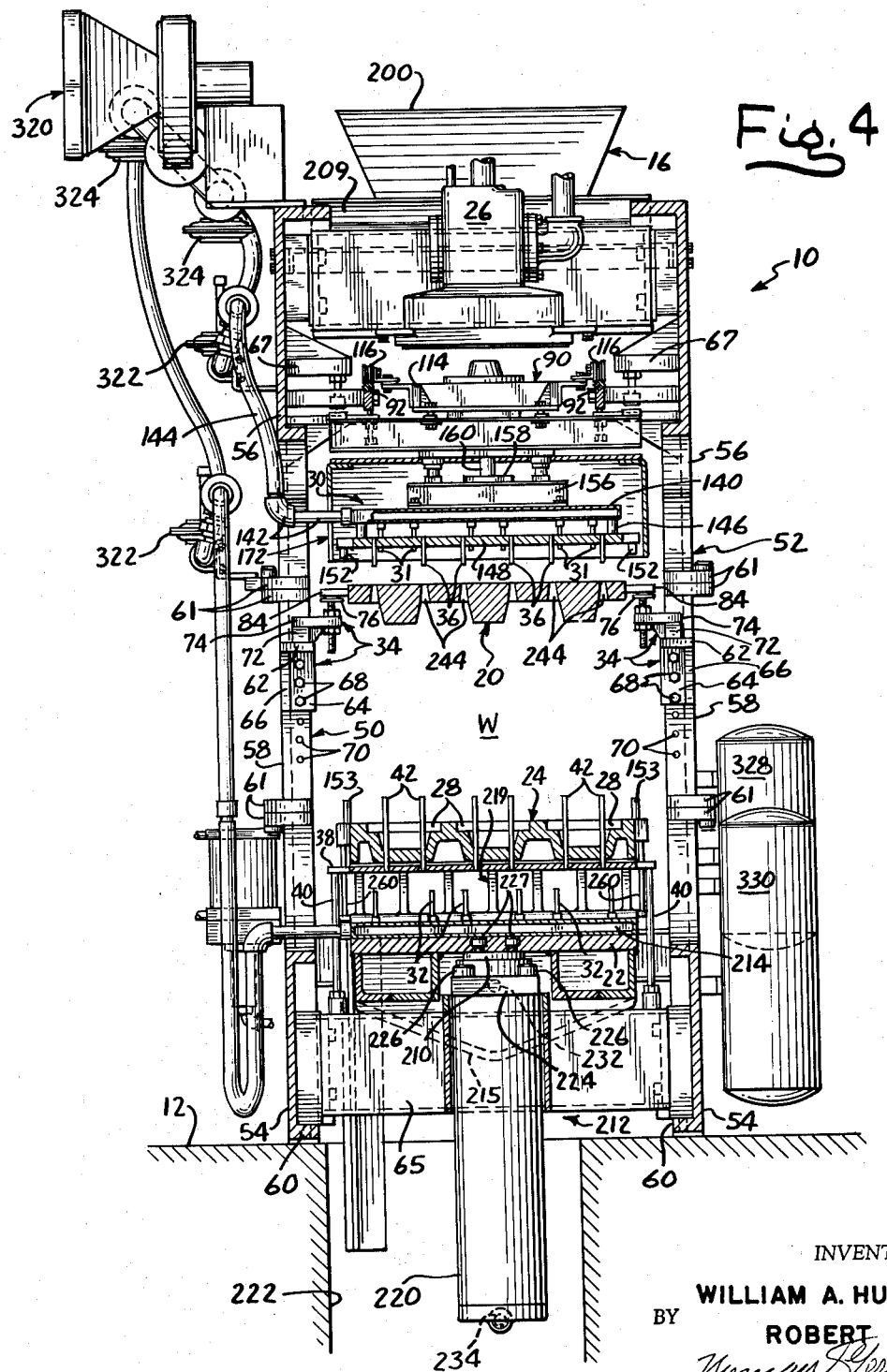
FIG. 4 is a sectional view taken on the line 4—4 of FIG. 1.

As best seen in FIGS. 4, 5 and 12, the ram plunger 210 is slidable in a clamp cylinder 220, the lower regions of which project below the level of the foundry floor 12, a suitable clearance well or pit 222 being provided for the cylinder. The clamp cylinder 220 is supported on the previously-mentioned transverse spacer members 65 which extend across the side members 50 and 52 near the bottom of the machine. Bolts 227 serve to attach the table 22 to the upper end of the plunger 210. The specific mounting for the clamp cylinder 220 includes a flange plate 224 which is located at the upper end of the cylinder and is connected by bolts 226 to the transverse spacer members 65.

Four of the previously-mentioned fix drag stripper plate-arresting posts 40 (see FIG. 5) are supported at the ends of the two spacer members 65 and these posts project vertically upwardly an appreciable distance so that they engage the drag stripper plate 38 near the end of the machine cycle and arrest its downward movement in order to effect stripping of the cores C from the lower core box or drag section 24, all in a manner that will become clear when the operation of the machine is set forth hereafter.

The cylinder 220 is provided at the ends thereof with fluid ports 232 and 234 for fluid actuation thereof at appropriate times in the machine cycle, as will be described subsequently. The fluid connections for the cylinder 220 and the fluid supply means have not been illustrated in detail herein but it will be understood that the plunger 210 is controlled in its movements by such fluid connections and supply means to effect the desired vertical shifting movements of the table 22 in opposite directions. These connections include a conduit 235 which is connected to the port 232. A valve 237 is interposed in the conduit and when the valve is closed, it prevents fluid from leaving the cylinder 220, thus locking the plunger 210 against movement in the cylinder.

THE CORE BOX

The specific shape, size and structural details of the upper and lower core box sections 20 and 24 will, of course, vary according to the number and character of the cores which are to be formed by the machine during each machine cycle. For exemplary purposes, the machine illustrated herein provides a plurality of core box cavities 28 and is adapted to produce a plurality of cores C during each machine cycle, and the cores C are generally of irregular muffin pan design, as best seen in FIG. 12. It is within the scope of the present invention to provide core box assemblies having a single cavity if desired.

The Upper Core Box Section

The upper core box or cope section 20 is in the form of a generally rectangular casting having a marginal rim portion 240 (see FIGS. 6, 8, 9 and 11) and, in addition, a medial region which is formed with protuberances 242 for producing core depressions or sockets. The previously-mentioned ears 84 are formed on the rim portion 240 and the holes 82 in these ears are designed for cooperation with the frusto-conical centering heads 80 on the arresting pins 76, as previously described.

A plurality of blow holes 244 are formed in the upper core box section 20 and such holes communicate with the core box cavities 28 when the upper and lower core box sections are assembled upon each other, are adapted to register with the blow holes 132 in the blow plate 130 for introduction of sand into the cavities 28 during the sand blow operation of the machine, and also are adapted to receive therein the lower ends of the cope stripper pins 36 as shown in FIGS. 7, 8 and 9 during the curing and core-ejecting phases of the machine cycle.

The Lower Core Box Section

The lower core box or drag section 24 is a counterpart of the upper core box or cope section. It is in the form of a casting having a marginal rim portion 250 (see FIGS. 6, 8, 9 and 11) and a medial region which is formed with protuberances 252. The latter, when the two core box sections 20 and 24 are closed upon each other, are staggered with respect to the protuberances 242 of the upper core box section. The previously mentioned stop pins 153, which cooperate with the pins 152 on the upper core box section, are carried in ears 254 which are formed on the rim portion 250 of the lower core box section 24.

A plurality of openings 256 are formed in the lower core box section 24, and such openings constitute guideways for the previously-mentioned core-ejecting drag stripper pins 42. The drag stripper pins 42 extend vertically and, normally, the upper end regions of the pins project upwardly and into the openings 256, while the extreme or tip ends of the pins lie flush with the inside faces or walls of the core box cavities. The drag stripper plate 38 supports and extends across the lower ends of the various pins 42 and establishes, in combination with the pins, a vertically shiftable drag stripper assembly. Normally, this assembly is supported or rests under the influence of gravitational forces upon the enlarged head portions 258 of four suspension bolts 260, the upper ends of which are secured in the ears 254 on the ends of the lower core box section 24. The suspension bolts pass through perforated or hole-equipped ears 264 at the ends of the plate 38 and the plate is thus freely slidable vertically on the suspension bolts 260.

Figure 13:
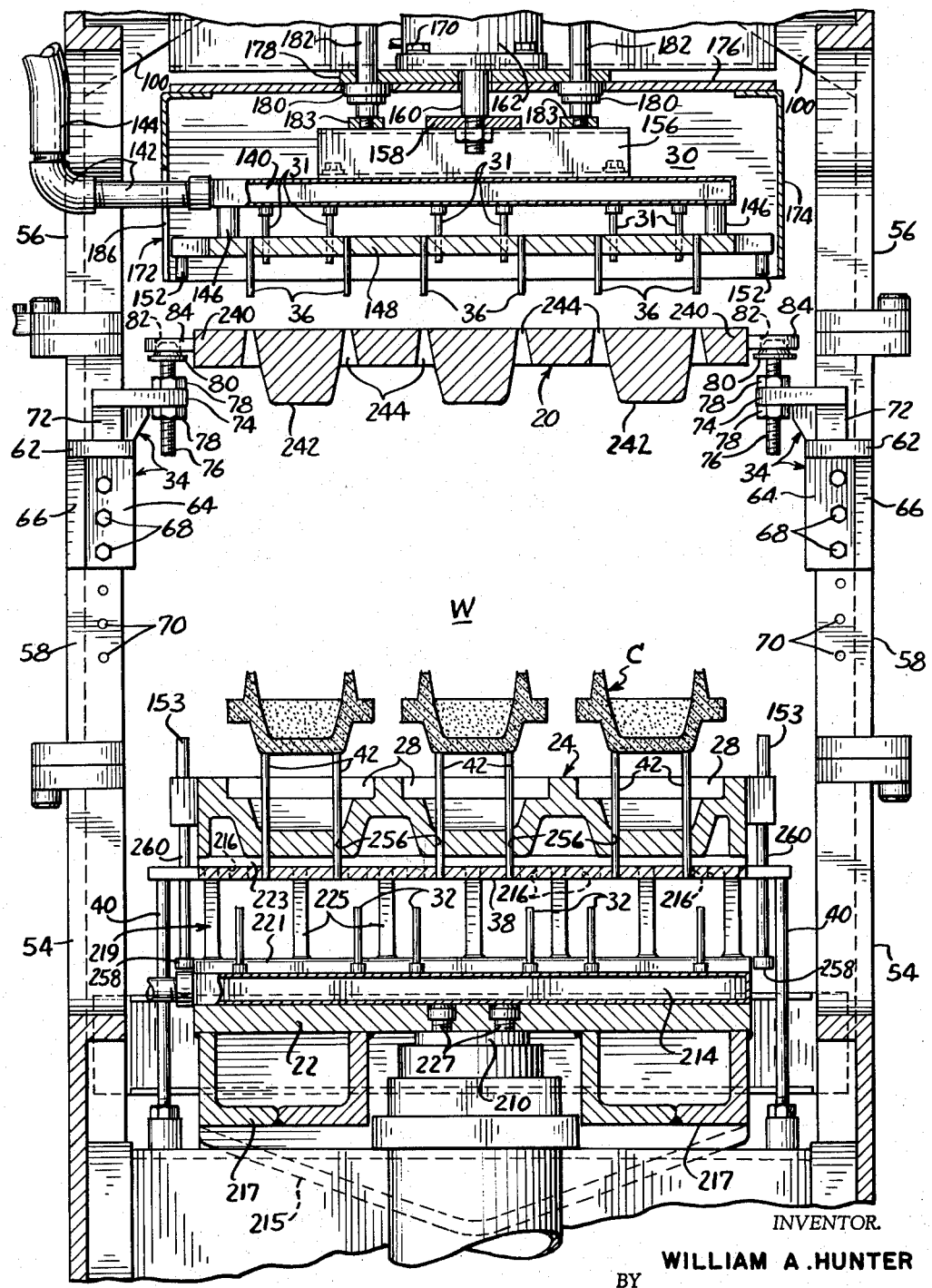
FIG. 13 is an enlarged sectional view taken on the line 13—13 of FIG. 12.

The drag stripper assembly which consists of the plate 38 and the drag stripper pins 42 is movable bodily between a lowered position, as shown in FIGS. 5, 6, 8, 9, 10 and 11, and a raised position, as shown in FIGS. 4, 12 and 13. In the lowered position of the assembly, the upper ends of the stripper pins 42 lie flush with the inside face of the lower core box section 24. In the upper position of the assembly, the upper ends of the pins 42 serve to support the cores C thereon in an elevated position as shown in FIG. 13. The raised and lowered positions referred to herein are, of course, positions which the drag stripper assembly assumes with respect to the lower core box section 24. As will become clear presently when the description of the operation of the machine is set forth, such relative movement between the drag stripper assembly and the lower core box section 24 is effected by engagement of the drag stripper plate 38 by the upper ends of the fixed arresting posts 40 as the table 22 is brought to its lowermost position near the end of the machine cycle.

The upwardly projecting, vertically extending stop pins 153, which, as previously described, cooperate with the downwardly projecting, vertically extending stop pins 152 on the cope stripper plate 148, are disposed near the ends of the upper core box section 24 and project upwardly from respective fixed supporting ears 155 on the upper core box section.

THE BLOW VALVE

Various forms of blow valves suitable for use in connection with the present machine 10 for ejecting sand from the sand magazine 18 and transferring the same to the core box are available and the specific blow valve 26 which is illustrated in the drawings is of more or less conventional design and construction. No claim is made herein to any novelty associated with the illustrated blow valve 26, it being deemed sufficient to state briefly that the valve 26, as shown in FIG. 6, includes a valve casing 270, the interior of which is divided by means of an internal web 272 into an air inlet chamber 274 and an air outlet chamber 276, the two chambers being in communication through a valve port 278. A cylindrical valve cage 280 has one end thereof sealed in the valve port 278 and its other end sealed in a port 282 which communicates with a pilot passage 284 in the valve casing 270. A valve plunger 286 carries a piston 288 at one end thereof and a valve element 290 at its other end. The plunger 286 is urged by means of a spring 292 in a direction to maintain the valve element 290 seated on one end of the cage so as effectively to close the port 278. When air under pressure is supplied to the pilot passage 284, the piston 288 and the plunger 286 are displaced so as to uncover the port 282 and thus permit air under pressure to blow from the chamber 274 to the chamber 276 and then from the chamber 276 to the interior of the magazine 18 for sand ejection purposes in the usual manner of blow operations for core box-filling purposes.

The blow valve 26 also includes a lower casing 294 of inverted dome-shape design. The lower rim of the casing 294 is provided with a flange 296 to receive therein the previously-mentioned sealing strip 128. The sealing strip surrounds a perforated sand distribution plate or grid 297 which is secured in position across the rim of the casing 294 by fastening screws 298.

After the sand has been blown and the piston 288 and the plunger 286 restored to their normal positions under the influence of the spring 292, the residual air pressure in the casing 294 is vented to atmosphere through an exhaust conduit 299 to prevent possible injury from flying sand to both the operator and the cores at the time stripping operations are in effect.

THE TABLE STABILIZING MECHANISM

In order to stabilize the table 22 and prevent turning movements thereof about the vertical axis of the clamp cylinder 220 so that proper alignment and register of the cope stripper pins 36 with the blow holes 244 in the upper core box section 20 will be maintained immediately before and during the cope-stripping phase of the machine cycle, as well as to prevent misalignment of various other operative machine instrumentalities in the working area, and to maintain the table, the lower burner assembly, and the lower core box squarely centered within the working area between the side members 50 and 52, a torque-assimilating bracket 300 (see FIGS. 14 and 15) is bolted to the side member 50 in the lower regions thereof, and this bracket carries a roller 302 at its outer end. The roller is mounted on the bracket for rotation about a horizontal axis. The table 22 has mounted thereon a vertically extending guide channel 304 within the confines of which the roller 302 is adapted to operate during the vertical movements of the table 22 in either direction.

The overall effective length of the guide channel 304 is at least as great as the amplitude of displacement of the table 22 so that, regardless of the position of the table at any given moment in the machine cycle, any incidental unbalanced application of torque to the table 22 and the instrumentalities carried thereby arising from any cause whatsoever, will be assimilated by the bracket 300 and the table will thus be maintained squarely stabilized within the working area W of the machine.

Fairly close tolerances between the roller 302 and the guide channel 304 are maintained to minimize rotation play of the table. Toward this end, hardened steel wear strips 306 are secured within the channel on opposite sides of the roller 302 and bear against the roller with practically no clearance.

MISCELLANEOUS INCIDENTAL DISCLOSURE

Figure 3:
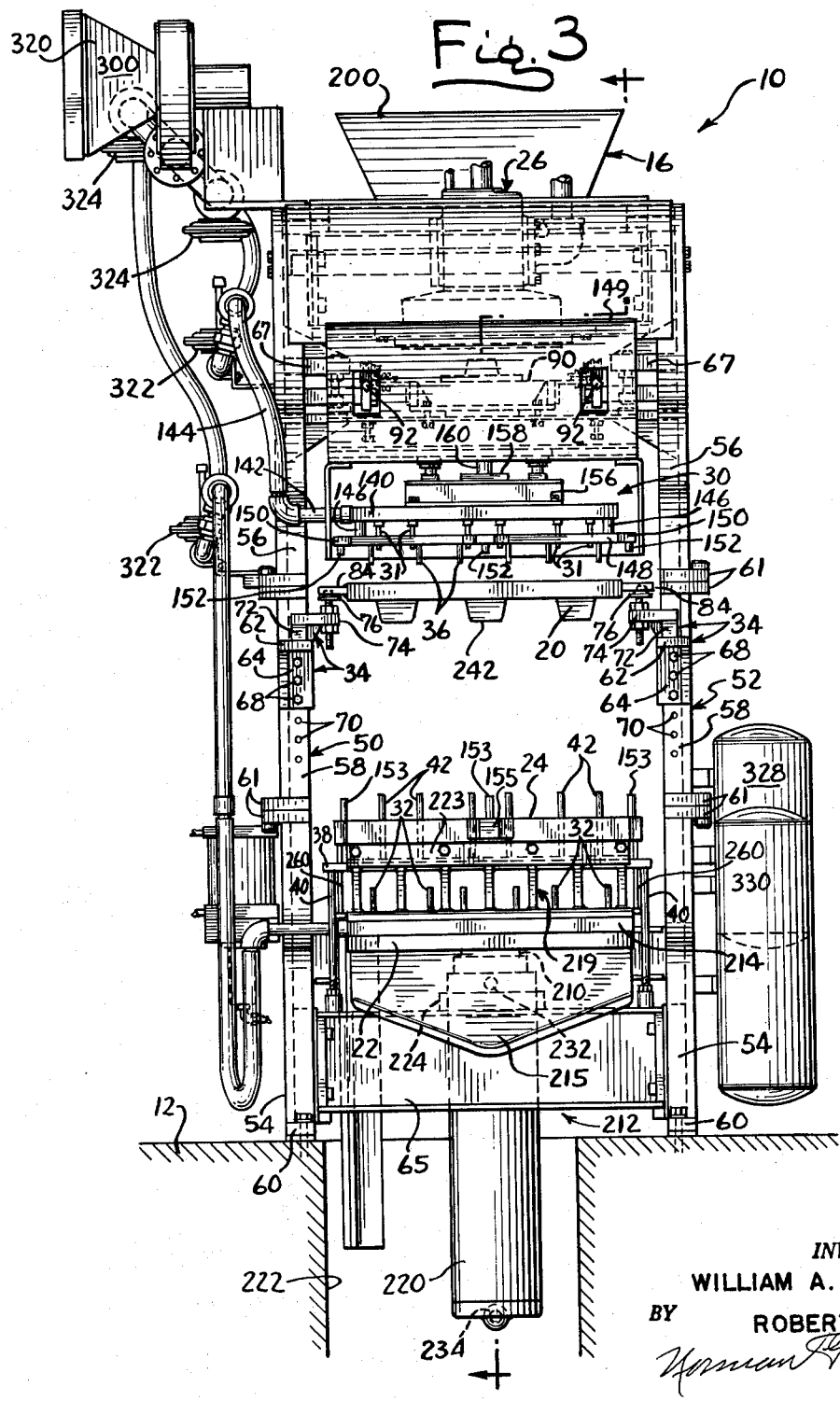
FIG. 3 is a front elevational view of the machine with the parts thereof in the same position as shown in FIGS. 1 and 2.

The core-making machine which is disclosed herein is fully automatic in its operation, but it is deemed unnecessary to illustrate or describe in detail the electrical, hydraulic, pneumatic and other operating control instrumentalities by means of which the movements of the various machine parts are correlated, or the timing mechanism for initiating actuation of such control instrumentalities. Incidental disclosures appearing in the drawings either where the function thereof is obvious or where the disclosures are not essential to the claimed invention herein have not been described. In FIGS. 3 and 4 of the drawings, portions of the fuel supply system for the upper and lower burner assemblies appear and it is deemed sufficient for purposes of discussion herein to state that the two burner assemblies employ a mixture of a fuel gas and air for their operation. Accordingly, to accommodate each burner assembly, air under pressure issuing from a blower 320 and a gaseous fuel issuing from a suitable source (not shown) are combined in a zero governor or other gas-mixing device 322 and are conducted under the control of an automatically operable valve 324 to the associated burner assembly, suitable piping 326 being provided for this purpose.

The hydraulic fluid which is employed for actuating the ram assembly 212 and the carriage 90 may be stored in a tank 328 (see FIGS. 2 and 4) and withdrawn therefrom as required during each machine cycle. A reserve tank 330 may be provided if desired.

OPERATION OF THE MACHINE

The figures of the accompanying drawings have been sequentially numbered to correspond insofar as practicable with sequential steps in the machine cycle and the position which the machine assumes in FIGS. 1 to 4, inclusive, represents the position of the various machine parts at the commencement of a machine cycle. In this position of the machine, the horizontally shiftable carriage 90 is in its retracted or rear position and the sand magazine 18 underlies the hopper assembly 16, while the table 24 is in its lowermost position. The lower or drag section 24 of the core box rests upon the table and the upper or cope section 20 of the core box is supported on the cope-arresting brackets 34. The drag stripper pins 42 project upwardly above the level of the upper section 20 of the core box and the cores which were produced during the preceding cycle have been removed from the upper ends of these pins by the aforementioned core-unloading apparatus 14. The upper gas burner and cope stripper assembly 30 is disposed within the working area W of the machine, but the burners are on low flame and the cope stripper pins 36 are exposed and without function, these two instrumentalities having served their function in the preceding machine cycle.

Air under pressure is supplied to the cylinder 121 to extend the plunger 127 (see FIG. 5) and move the carriage 90 to its advanced or forward position, whereupon the upper gas burner and cope stripper assembly is displaced bodily from the working area W of the machine and projected forwardly thereof to the position wherein it is shown in FIG. 5. At the same time, the sand-filled magazine 18 is brought into the working area of the machine in vertical alignment with the blow valve 26 thereabove and with the upper or cope section 20 of the core box therebeneath.

During the time that the carriage 30 is moving forwardly to bring the filled sand magazine into the working area of the machine, the ram assembly 212 is operated to extend the plunger 210 and raise the table 22 from its lowermost position to its uppermost position. At approximately the time that the carriage 90 reaches the limit of its forward stroke, the table 22 reaches the limit of its upward stroke. During the upward movement of the table 22, the lower or drag section 24 of the core box engages or picks up, so to speak, the upper core box section 20, lifts the same from the cope-arresting bracket 34, and forces the upper side thereof into sealing engagement with the blow plate 130 at the lower rim of the lower magazine section 122, while at the same time, the upper rim of the upper magazine section 120 is forced into engagement with the sealing strip 128 and moves into operative register with the perforated grid 297 of the lower casing 294 of the blow valve 26. The clamp cylinder 220 thus serves to clamp the upper and lower core box sections 20 and 24, the magazine 18 and the blow valve 26 together in sealing relationship preparatory to performance of the blow operation. With the parts thus clamped together, the previously-described supporting connections for the magazine 18 on the horizontally reciprocable carriage 90 will transmit the upward thrust which is applied to the magazine to the carriage and the latter will be lifted from the track rails 92 as indicated by the clearances which exist between the rollers 116 and the rails 92 in FIG. 6.

At this point in the machine cycle and with the parts thus clamped together as described above, the blow operation is instituted by admitting air through the pilot passage 284 of the blow valve 26 and the resultant displacement of the valve plunger 286 and piston 288 will admit air under high pressure to the interior of the magazine 18 to carry the sand contained therein through the orifices in the blow plate 130 and into the blow holes 244 in the upper or cope section 20 of the core box and to pack the sand into the core box cavities 28.

At an appropriate time in the machine cycle, which may be during the cavity-filling operation or immediately thereafter, the supply of gaseous fuel to the lower burners 32 may be increased to commence heating of the lower or drag section 24 of the core box.

When the cavity-filling operation has been completed, the clamp cylinder 220 is momentarily actuated under the control of the valve 237 to lower the table 22 a small predetermined distance and relieve the clamping pressure between the magazine 18 and the lower casing 294 of the blow valve 26 so that the carriage 90 is free to be shifted rearwardly to its retracted position. Air under pressure is then applied to the air cylinder 121 to thus retract the carriage and return the magazine 18 to its position of operative vertical registry with the hopper assembly 16 for refilling with sand for use during the next succeeding machine cycle.

At the same time that the magazine 18 is brought into registry with the hopper assembly 16, the upper burner and cope stripper assembly 30 is shifted from the forwardly displaced position wherein it is shown in FIG. 5, to the operative position thereof shown in FIG. 7 wherein this assembly is disposed within the working area W of the machine and is in operative register with the upper or cope section 20 of the core box.

Upon arrival of the upper burner and cope stripper assembly 30 at the working area, the supply of gaseous fuel to the upper burners 31 is increased and cope heating operations are commenced. After a brief period of curing time, which may be on the order of from seven to ten seconds, the resin-bonded or coated sand within the core box cavities will have become polymerized and the cores C within the cavities will resultantly have become set. However, prior to such polymerization of the sand, and while the same is still capable of sand displacement, air under pressure will be supplied to the cylinder 162 to extend the plunger 160 and cause the stripper plate 148 (see FIGS. 7 and 8) to move downwardly so that the lower ends of the core stripper pins 36 will enter the blow holes 244 in the upper core box section 20 and displace the sand contained therein. Such downward movement of the stripper plate 148 and the pins 36 is limited by engagement of the stop pins 152 on the stripper plate 148 with the stop pins 153 on the upper or cope section 20 of the core box. With these stop pins 152 and 153 in engagement with one another, the extent of entry of the cope stripper pins 36 into the blow openings 244 is limited and, during subsequent curing of the resin-bonded sand in both the cavities 28 and the blow holes 244, the lower ends of the pins 36 will be left in intimate contact with the sprue-like protuberances which are formed on the finished cores C. This makes for a square push-out operation during subsequent core-stripping operations. Since the downward movement of the stripper plate 148 is limited by engagement of the stop pins 152 and 153 as shown in FIG. 8, the upward force which is applied to the air cylinder 162 under the influence of pneumatic pressure within the cylinder acting against the piston 164 causes the carriage 90 as a whole to be lifted from its support upon the track rails 92, and this upward thrust is assimilated by the reaction brackets 67, the reaction pins 69 of which are engaged by the stop blocks 194.

After the cores C have become set and with the supply of air to the air cylinder 162 still effective, downward movement of the table 22 under the influence of the clamp cylinder 220 is continued, and from this point in the machine cycle until the completion of the cycle, the gradual lowering of the table is continued in a uniform manner. As the table and core box supported thereby are moved downwardly, the holes 82 (see FIG. 9) in the ears 84 on the upper or cope section 20 of the core box will seat upon the frusto-conical heads 80 of the arresting pins 76 on the arresting brackets 34 and prevent further downward movement of the core box section 20. At no time during the machine cycle does the upper or cope section 20 move below the level which it assumes when the holes and pins 76 are in their operative seating engagement. This level may be adjusted by reason of the threaded engagement between the arresting pins 76 and the holders 74 within which they are threaded.

With the downward movement of the upper or cope section 20 of the core box thus arrested, continued lowering of the table 22 will allow the lower or drag section 24 to become parted from the upper section 20 under the influence of the cope stripper pins 36 which continue to be urged downwardly under the influence of the air which is supplied to the cylinder 162. The cores C are thus pushed out or stripped from the upper core box section 20 as shown in FIG. 9.

As the table 22 continues its downward movement, the drag stripper plate 38 which up to this point in the machine cycle is seated upon the enlarged heads (see FIG. 9) of the suspension bolts 260, is engaged by the fixed vertically extending arresting posts 40 and further downward movement of the stripper plate 38 is prevented. However, since the table 22 and the upper or drag section 24 of the core box continue in their downward movement, the downward movement of the cores C is now arrested so that the cores are pushed out or stripped from the lower section 24 of the core box as shown in FIGS. 12 and 13 and left supported on the upper ends of the drag stripper pins 42 where they are exposed and accessible for core removal operations in any suitable manner, as, for example, by means of the core-unloading apparatus 14 of FIGS. 1 and 2. The table 22 and the lower section 24 of the core box continue to move to the lowermost positions of which they are capable of assuming and the various machine instrumentalities then assume the position which they assumed at the commencement of the machine cycle.

The disclosure of FIG. 12 and the disclosure of FIG. 3 represent positions of the machine at the commencement and at the completion of the machine cycle. Thus, apart from being differently selected views of the machine, the positions of the operative machine instrumentalities remain precisely the same. In FIG. 1, the cores C are absent since the cores resulting from a preceding machine cycle are assumed to have been removed by the core-unloading apparatus 14. In FIG. 12, the cores C are present and are shown as resting on the upper ends of the drag stripper pins, but if the presence of the cores be disregarded, this view will represent a true section on the line 12—12 of FIG. 3. For these reasons, the cores are shown in dotted lines instead of full lines in FIG. 12.

THE CORE-UNLOADING APPARATUS

The cores C which remain elevated in an exposed position on the upper ends of the drag stripper pins 42 at the end of the machine cycle as shown in FIGS. 12 and 13 may be removed manually from the machine, or they may be unloaded by any suitable unloading mechanism, as, for example, the mechanism 14 of FIGS. 1 and 2. Where an unloading apparatus is employed, the movements of the same will be correlated with the movements of the machine 10 for core pick-off operations in between machine cycles.

The unloading apparatus 14, as previously pointed out, is like that of copending United States patent application Serial No. 114,483. Briefly, it involves in its general organization a housing 350 on which there is movably mounted a carriage 352. The carriage is normally disposed adjacent to the rear end of the apparatus. It includes the previously-mentioned lift fingers 44 which are movable bodily with the carriage and are adapted to be projected forwardly over the table 22 of the core-making machine 10 in such a manner that they straddle or interlace with the drag stripper pins 42 on which the cores C rest, and underlie the cores C. Thereafter, upon vertical movement of the carriage 352, the fingers 44 move upwardly and engage the cores C to lift the same from the upper ends of the pins 42.

The carriage 352, in the elevated position of the fingers 44, is then moved rearwardly to carry the cores C away from the machine 12 and, finally, the carriage is lowered to its initial retracted position to bring the cores C to a convenient elevation for handling in the removal thereof to a remote location. The carriage 352 thus moves in a closed rectilinear path to accomplish core-removal operations, the path describing a true rectangle.

The core-unloading apparatus 14 is adapted to be positioned on the foundry floor 12 or other supporting surface immediately in front of the core-making machine 10 near the working area W of the latter. The apparatus is so designed, insofar as its height is concerned, that the fingers 44 will in the normal condition of the apparatus assume an elevation wherein the general plane thereof lies slightly above the plane of the lower core box sections 24 as shown in FIG. 1. The housing 350 is provided at its lower end with a flange 356 by means of which the housing may be bolted to the foundry floor 12.

There has been disclosed herein the details of the essential fixed and movable machine parts and instrumentalities which cooperate to make up an operative automatic core-making machine embodying the principles of the present invention. Such disclosure is, however, merely exemplary of a machine which will produce cores during each machine cycle, the cores possessing the shape characteristics of the cores which are shown in FIG. 13 for example. It will be understood that the machine is adaptable for use in making a single core during each machine cycle, as well as being adaptable for making cores which vary widely in their size and shape characteristics. Ordinarily, it will not be necessary to redesign any of the principal machine parts to effect a changeover operation from the production of one class of cores to another class of cores. Multiple cavity core boxes may be substituted for single cavity core boxes, and core box height, width, and thickness may be varied at will by suitable core box substitution.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

Having thus described the invention what we claim as new and desire to secure by Letters Patent is:

1. In a core-making machine of the character described, in combination, a machine framework establishing a working area, a lift table, a separable core box in the form of a lower drag section and an upper cope section, a sand magazine and a blow valve disposed in said working area in superposed relationship in the order named, said framework including a cope-arresting support, said upper cope section being movable vertically between a lowered position wherein it rests by gravity upon said cope-arresting support, and a raised position wherein it is in operative engagement with said sand magazine, said lower drag section being supported upon said table and movable bodily therewith, said table being movable vertically from a lowered position wherein the lower drag section thereon is disposed below the level of said cope-arresting support, through an intermediate position wherein said lower drag section sealingly engages the upper cope section and raises the same from said cope-arresting support, to an elevated position wherein it forces the lower drag section against the upper cope section to force, in turn, the upper cope section against the magazine and thus force the magazine against the blow valve, thereby clamping the two core box sections, magazine and blow valve together in their operative relationship, and vice versa, said core box sections being so formed that when they are thus clamped, they define therebetween a core-forming cavity in communication with the sand magazine, said lower drag section having formed in its bottom portion a plurality of holes in vertical communication with said core-forming cavity when the two core box sections are clamped together, a drag stripper plate movably carried by said drag section, a plurality of upstanding drag stripper pins mounted on said plate, projecting into said holes and slidable vertically in the latter, the upper ends of said pins normally lying below the confines of the core-forming cavity, and a fixed abutment on the machine framework and engageable with said plate during descent of said table and as the same approaches the limit of its lowered position for arresting said plate to control said drag stripper pins so that they have relative vertical motion with respect to the lower drag section for core-stripping purposes.

2. In a core-making machine, the combination set forth in claim 1 and including, additionally, a plurality of guide pins depending from the underneath side of the lower drag section and having enlarged heads at their lower ends, said drag stripper plate being slidable vertically on said guide pins and normally resting by gravity on said enlarged heads.

3. In a core-making machine, the combination set forth in claim 2 and wherein the upper ends of said guide pins present surfaces which constitute a smooth continuation of the bottom wall surface of that portion of the core box cavity which is defined by the lower drag section.

4. In a core-making machine of the character described, in combination, a machine framework establishing a working area, a lift table, a separable core box in the form of a lower drag section and an upper cope section, a sand magazine and a blow valve disposed in said working area in superposed relationship in the order named, said framework including a cope-arresting support, said upper cope section being movable vertically between a lowered position wherein it rests by gravity upon said cope-arresting support, and a raised position wherein it is in operative engagement with said sand magazine, said lower drag section being supported upon said table and movable bodily therewith, said table being movable vertically from a lowered position wherein the lower drag section thereon is disposed below the level of said cope-arresting support, through an intermediate position wherein said lower drag section sealingly engages the upper cope section and raises the same from said cope-arresting support, to an elevated position wherein it forces the lower drag section against the upper cope section to force, in turn, the upper cope section against the magazine and thus force the magazine against the blow valve, thereby clamping the two core box sections, magazine and blow valve together in their operative relationship, and vice versa, said core box sections being so formed that when they are thus clamped they define therebetween a core-forming cavity designed for communication with the sand magazine, said lower drag section having formed in its bottom portion a plurality of holes in vertical communication with said core-forming cavity when the two core box sections are clamped together, a plurality of upstanding drag stripper pins movably carried by said lower drag section, projecting into said holes, and slidable vertically in the latter, said pins normally lying below the confines of the core-forming cavity, a drag stripper plate common to said pins and on which the pins are mounted, said plate being disposed exteriorly of the lower drag section and underlying the same, a fixed abutment on the machine framework and engageable with said plate during descent of the table to arrest the downward movement of the plate and establish relative vertical movement between the plate and lower drag section, thus projecting the upper ends of the pins into that portion of the core box cavity which is defined by the lower drag section, said table including a table platform and a drag-supporting frame immediately thereabove and supported thereon, said drag-supporting frame being directly engageable with the lower drag section for lifting purposes, a gas manifold mounted on the table platform, there being a series of openings in the drag-stripper plate, and a series of upstanding flame-producing burner elements projecting upwardly from said manifold and passing through said openings.

5. In a core-making machine of the character described, in combination, a machine framework establishing a working area, a lift table, a separable core box in the form of a lower drag section and an upper cope section, a sand magazine and a blow valve disposed in said working area in superposed relationship in the order named, said framework including a cope-arresting support, said upper cope section being movable vertically between a lowered position wherein it rests by gravity upon said cope-arresting support, and a raised position wherein it is in operative engagement with said sand magazine, said lower drag section being supported upon said table and movable bodily therewith, said table being movable vertically from a lowered position wherein the lower drag section supported thereby is disposed below the level of said cope-arresting support, through an intermediate position wherein said lower drag section sealingly engages the upper cope section and raises the same from said cope-arresting support, to an elevated position wherein it forces the lower drag section against the upper cope section to force, in turn, the upper cope section against the magazine and thus force the magazine against the blow valve, thereby clamping the two core box sections, magazine and blow valve together in their operative relationship, and vice versa, said core box sections being so formed that when they are thus clamped, they define therebetween a core-forming cavity designed for communication with the sand magazine, said lower drag section having formed in the bottom portion a plurality of holes in vertical communication with said core-forming cavity when the two core box sections are clamped together, a plurality of upstanding drag stripper pins movably carried by said lower drag section, a drag-stripper plate common to said pins and on which the pins are mounted, a plurality of guide pins depending from said bottom portion of the lower drag section and having enlarged heads at their lower ends, said drag-stripper plate being slidable vertically on said guide pins and normally resting by gravity on said enlarged heads, an arresting post on the machine framework and engageable with said plate during descent of the table for arresting the downward movement of the drag-stripper plate and the pins carried thereby, said table including a table platform and a drag-supporting frame immediately thereabove and resting thereon, said drag-supporting frame being directly engageable with the lower drag section for lifting purposes, and a core box heating burner assembly mounted on the table platform and underlying said lower drag section, said burner assembly including a gas manifold mounted on the table platform and a series of upstanding flame-producing burner elements projecting upwardly above the level of the drag-stripper plate when the latter rests on said enlarged heads of the guide pins.

6. In a core-making machine, the combination set forth in claim 5 and wherein said drag stripper plate is formed with a series of openings therethrough, said burner elements projecting upwardly through said openings when the drag stripper plate rests upon the enlarged heads of the guide pins.

7. In a core-making machine, the combination set forth in claim 1, including, additionally, means for adjusting the elevation of said cope-arresting support.

8. In a core-making machine of the character described, in combination, a machine framework defining a working area, a lift table, a separable core box in the form of a lower drag section and an upper cope section and a blow valve permanently disposed in said area in superposed relationship and in the order named, a sand hopper mounted on the machine framework at a supply station outside of the working area, a sand magazine mounted for lateral shifting movements in opposite directions and movable between a retracted position wherein it underlies the sand hopper for filling purposes, and an advanced position wherein it is projected into the working area between the blow valve and the upper cope section of the box, said framework including a cope-arresting support, said upper cope section being movable vertically between a lowered position wherein it rests by gravity upon said cope-arresting support, and a raised position wherein it is in operative engagement with said sand magazine when the latter is in its advanced position, said lower drag section being supported upon the lift table and movable bodily therewith, said table being movable vertically from a lowered position wherein the lower drag section thereon is disposed below the level of said cope-arresting support, through an intermediate position wherein said lower drag section sealingly engages the upper cope section and raises the same from said cope-arresting support, to an elevated position wherein it forces the lower drag section against the upper cope section to force, in turn, the upper cope section against the magazine and thus force the magazine and blow valve together in their operative relationship, and vice versa, said core box sections being so formed that when they are thus clamped, they define therebetween a core-forming cavity in communication with the sand magazine, said lower drag section embodying in its bottom portion a plurality of holes in vertical communication with said core-forming cavity when the two core box sections are clamped together, a plurality of upstanding drag stripper pins movably carried by said lower drag section, projecting into said holes, and slidable vertically therein, said pins normally lying below the confines of the core-forming cavity, an abutment mounted on said framework and operable during the descent of said table and as the same approaches the limit of its lowered position effectively to engage said drag stripper pins and arrest their downward motion with respect to the drag section for core-stripping purposes, means for moving said table vertically in opposite directions between its lowered and its elevated positions, and means for moving said magazine laterally between its retracted and its advanced positions.

9. In a core-making machine, the combination set forth in claim 8 and including, additionally, a drag-stripper plate common to said pins and on which the pins are mounted and from which they project upwardly, said plate being disposed exteriorly of the drag section, underlying the same, and being designed for engagement with the abutment on the framework during descent of the table.

10. In a core-making machine, the combination set forth in claim 9 and wherein the upper ends of the guide pins present surfaces which constitute a smooth continuation of the inside wall surface of that portion of the core box cavity which is defined by the lower drag section.

11. In a core-making machine of the character described, in combination, a machine framework defining a working area, a lift table, a separable core box in the form of a lower drag section and an upper cope section, and a blow valve permanently disposed in said area in superposed relationship and in the order named, a sand hopper mounted on the machine framework at a supply station outside of the working area, a carriage assembly including a sand magazine and a cope-heating burner, mounted for lateral shifting movements in opposite directions and movable between a retracted position wherein the magazine underlies the sand hopper for filling purposes and the burner is operatively disposed in said working area, and an advanced position wherein the magazine is projected into the working area between the blow valve and the upper cope section and the burner is displaced laterally from said working area, said framework including a cope-arresting support, said upper cope section being movable vertically between a lowered position wherein it rests by gravity upon said cope-arresting support, and a raised position wherein it is in operative engagement with said sand magazine when the carriage assembly is in its advanced position, said lower drag section being supported upon the lift table and movable bodily therewith, said table being movable vertically from a lowered position wherein the lower drag section thereon is disposed below the level of said cope-arresting support, through an intermediate position wherein said lower drag section sealingly engages the upper cope section and raises the same from said cope-arresting support, to an elevated position wherein it forces the lower drag section against the upper cope section to force, in turn, the upper cope section against the magazine and thus force the magazine and blow valve together in their operative relationship, and vice versa, said core box sections being so formed that when they are thus clamped they define therebetween a core-forming cavity in communication with the sand magazine, said lower drag section being formed with a plurality of holes therein in vertical communication with said core-forming cavity when the two core box sections are clamped together, a plurality of upstanding drag-stripper pins movably carried by said cope section, projecting into said holes, and slidable vertically therein, said pins normally lying below the confines of the core-forming cavity, means operable during the descent of said table and as the same approaches the limit of its lowered position for moving said drag-stripper pins bodily in unison vertically with respect to the drag section for core-stripping purposes, means for moving said table vertically in opposite directions between its lowered and its elevated positions, and means for moving said carriage assembly laterally between its retracted and its advanced positions.

12. In a core-making machine, the combination set forth in claim 11 and including, additionally, a drag-stripper plate common to said pins and on which the pins are mounted, a plurality of guide pins depending from the bottom portion of the lower drag section and having enlarged heads at their lower ends, said drag-stripper plate being slidable vertically on said guide pins and normally resting by gravity on the enlarged heads of said guide pins, and wherein said means for moving said drag stripper pins comprises an arresting post mounted on the machine framework and arranged so that it is engageable with said plate during descent of the table to the end that it arrests the downward movement of the plate and the pins carried thereby.

13. In a core-making machine of the character described, in combination, a machine framework defining a working area, a lift table, a separable core box in the form of a lower drag section and an upper cope section, and a blow valve permanently disposed in said area in superposed relationship and in the order named, a sand hopper disposed at a supply station outside of the working area, a pair of rails extending horizontally between the hopper and said working area, a carriage having traction rollers normally supported on said rails for movement therealong, a sand magazine and an upper core box heating burner assembly fixedly mounted on said carriage and movable bodily therewith, said carriage being movable between a retracted position wherein the magazine underlies the sand hopper for filling purposes and the burner is operatively disposed in said working area, and an advanced position wherein the sand magazine is projected into the working area between the blow valve and the upper cope section of the core box and the burner is displaced laterally from said working area, said framework including a cope-arresting support, said upper cope section being movable vertically between a lowered position wherein it rests by gravity upon said cope-arresting support, and a raised position wherein it is in operative engagement with said sand magazine when the carriage is in its advanced position, said lower drag section being supported upon said table and movable bodily therewith, said table being movable vertically from a lowered position wherein the lower drag section thereon is disposed below the level of said cope-arresting support, through an intermediate position wherein said lower drag section sealingly engages the upper cope section and raises the same from said cope-arresting support, to an advanced position wherein it forces the lower drag section against the upper cope section to force, in turn, the upper cope section against the magazine and thus force the magazine and carriage upwardly to lift the carriage from said rails and bring the magazine into operative register with the blow valve, and vice versa, said core box sections being so formed that when they are clamped together, they define therebetween a core-forming cavity designed for communication with the sand magazine, said table including a table platform and a drag-supporting frame immediately thereabove and resting thereon, said drag-supporting frame serving directly to support the lower drag section of the core box and maintain the same spaced upwardly from the upper surface of the table platform, and a lower core box heating burner assembly mounted on the table platform and underlying said lower drag section, cooperating abutments on the carriage and framework respectively and independent of said blow valve for limiting the upward movement of the carriage.

14. In a core-making machine, the combination set forth in claim 13 and including, additionally, means for regulably adjusting the elevation of said rails.

References Cited in the file of this patent

UNITED STATES PATENTS

| | | |
|---|---|---|
| 955,838 | Allenson | Apr. 19, 1910 |
| 2,724,878 | Valyi | Nov. 29, 1955 |
| 2,856,653 | Sutter | Oct. 21, 1958 |
| 2,929,119 | Ronne | Mar. 22, 1960 |
| 2,968,846 | Miller | Jan. 24, 1961 |